US011424694B2

(12) United States Patent
Zhuang et al.

(10) Patent No.: US 11,424,694 B2
(45) Date of Patent: Aug. 23, 2022

(54) METHOD FOR CONTROLLING SHUTDOWN WAVE BLOCKING OF MULTILEVEL INVERTER CIRCUIT AND APPLICATION THEREOF

(71) Applicant: SUNGROW POWER SUPPLY CO., LTD., Anhui (CN)

(72) Inventors: Jiacai Zhuang, Anhui (CN); Jun Xu, Anhui (CN); Bing Zhang, Anhui (CN); Peng Wen, Anhui (CN); Peng Wang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 102 days.

(21) Appl. No.: 16/729,254

(22) Filed: Dec. 27, 2019

(65) Prior Publication Data

US 2020/0358369 A1 Nov. 12, 2020

(30) Foreign Application Priority Data

May 10, 2019 (CN) .......................... 201910387311.0

(51) Int. Cl.
*H02M 7/487* (2007.01)
*H02M 7/5387* (2007.01)
(Continued)

(52) U.S. Cl.
CPC .......... *H02M 7/487* (2013.01); *H02M 7/5387* (2013.01); *H02M 1/083* (2013.01); *H02M 1/36* (2013.01)

(58) Field of Classification Search
CPC .......... H02M 1/36; H02M 1/32; H02M 7/487; H02M 7/5387; H02M 1/083; H02H 7/122; H02J 3/18
See application file for complete search history.

(56) References Cited

U.S. PATENT DOCUMENTS 6,337,804 B1 * 1/2002 Kea .................. H02M 7/487
363/132
9,294,010 B2 3/2016 Viitanen et al.
(Continued)

FOREIGN PATENT DOCUMENTS

CN 102163852 A 8/2011
CN 104052254 A 9/2014
(Continued)

OTHER PUBLICATIONS

First Chinese Office Action regarding Application No. 201910387311.0 dated Apr. 24, 2020. English translation provided by Unitalen Attorneys at Law.

(Continued)

*Primary Examiner* — Yusef A Ahmed
(74) *Attorney, Agent, or Firm* — Harness, Dickey & Pierce, P.L.C.

(57) ABSTRACT

A method for controlling shutdown wave blocking of a multilevel inverter circuit and an application apparatus for applying the method are provided. After a shutdown command is issued, the multilevel inverter circuit is controlled to switch between a free state and a specific turn-on state. The free state is a state in which all switch tubes in the multilevel inverter circuit are turned off. The specific turn-on state is a state in which voltage stress withstood by a switch tube, on which clamping protection is not performed, in the multilevel inverter circuit is zero by controlling a specific combination of switch tubes in the multilevel inverter circuit to be turned on.

10 Claims, 28 Drawing Sheets

(51) Int. Cl.
*H02M 1/36* (2007.01)
*H02M 1/08* (2006.01)

(56) References Cited

U.S. PATENT DOCUMENTS

| | | | | |
|---|---|---|---|---|
| 9,667,167 B2* | 5/2017 | Dong | | H02M 1/32 |
| 10,355,618 B2* | 7/2019 | Zhuang | | H02M 7/487 |
| 10,541,623 B1* | 1/2020 | Michal | | H02M 7/487 |
| 10,547,251 B1* | 1/2020 | Pan | | H02M 7/487 |
| 2003/0026118 A1* | 2/2003 | Ikimi | | H02M 7/487 |
| | | | | 363/132 |
| 2005/0141248 A1* | 6/2005 | Mazumder | | H02J 3/381 |
| | | | | 363/39 |
| 2012/0018777 A1* | 1/2012 | Takizawa | | H02M 1/32 |
| | | | | 257/140 |
| 2012/0057380 A1* | 3/2012 | Abe | | H02M 7/487 |
| | | | | 363/62 |
| 2013/0134710 A1* | 5/2013 | Yuan | | H02M 1/00 |
| | | | | 290/44 |
| 2013/0258728 A1* | 10/2013 | Takizawa | | H02M 1/32 |
| | | | | 363/50 |
| 2013/0343103 A1* | 12/2013 | Takizawa | | H02M 7/483 |
| | | | | 363/53 |
| 2014/0009979 A1 | 1/2014 | Alexander | | |
| 2014/0111959 A1* | 4/2014 | Li | | H02M 7/487 |
| | | | | 174/68.2 |
| 2014/0204636 A1* | 7/2014 | Liu | | H02M 1/32 |
| | | | | 363/55 |
| 2014/0268940 A1* | 9/2014 | Viitanen | | H02M 7/487 |
| | | | | 363/123 |
| 2014/0362620 A1* | 12/2014 | Yoo | | H02M 7/483 |
| | | | | 363/37 |
| 2015/0003127 A1* | 1/2015 | Takizawa | | H02M 1/32 |
| | | | | 363/123 |
| 2015/0016169 A1* | 1/2015 | Honea | | H02M 7/483 |
| | | | | 363/132 |
| 2015/0062984 A1* | 3/2015 | Hu | | H02M 7/493 |
| | | | | 363/71 |
| 2015/0200602 A1* | 7/2015 | Narimani | | H02M 5/4585 |
| | | | | 363/37 |
| 2015/0214856 A1* | 7/2015 | Nakashima | | H02M 7/537 |
| | | | | 363/131 |
| 2015/0222201 A1* | 8/2015 | Nakashima | | H02M 7/003 |
| | | | | 363/131 |
| 2015/0303825 A1* | 10/2015 | Harada | | H02M 1/32 |
| | | | | 363/97 |
| 2016/0006368 A1* | 1/2016 | Kusuno | | H02M 7/487 |
| | | | | 363/131 |
| 2016/0013734 A1* | 1/2016 | White | | H02M 7/537 |
| | | | | 363/131 |
| 2016/0043659 A1* | 2/2016 | Xu | | H02M 7/487 |
| | | | | 363/131 |
| 2016/0094153 A1* | 3/2016 | Li | | H02M 7/797 |
| | | | | 363/123 |
| 2016/0099654 A1* | 4/2016 | Viitanen | | H02M 7/487 |
| | | | | 363/37 |
| 2017/0005562 A1* | 1/2017 | Agirman | | H02M 5/4585 |
| 2017/0085125 A1* | 3/2017 | Ghosh | | H02M 3/04 |
| 2018/0041109 A1* | 2/2018 | Xu | | H02M 1/088 |
| 2018/0152097 A1* | 5/2018 | Ying | | H02M 1/32 |
| 2018/0219492 A1* | 8/2018 | Shi | | H02M 7/537 |
| 2018/0302005 A1* | 10/2018 | Cui | | H02M 7/487 |
| 2019/0267912 A1* | 8/2019 | Ishino | | H01L 27/0647 |
| 2020/0021182 A1* | 1/2020 | Kao | | H02M 7/53871 |
| 2020/0076301 A1 | 3/2020 | Zhuang et al. | | |
| 2020/0119658 A1* | 4/2020 | Zhang | | H02M 7/53871 |
| 2020/0153361 A1* | 5/2020 | Zmood | | H02M 7/537 |
| 2020/0177100 A1* | 6/2020 | Wang | | H02M 7/5387 |
| 2021/0050797 A1* | 2/2021 | Xu | | H02M 7/5387 |
| 2021/0367530 A1* | 11/2021 | Du | | H02M 7/487 |
| 2021/0384844 A1* | 12/2021 | Li | | H02M 1/32 |

FOREIGN PATENT DOCUMENTS

| | | |
|---|---|---|
| CN | 104377659 A | 2/2015 |
| CN | 105406747 A | 3/2016 |
| CN | 105552851 A | 5/2016 |
| CN | 106887965 A | 6/2017 |
| CN | 206517381 U | 9/2017 |
| CN | 108923632 A | 11/2018 |
| JP | 2004096833 A | 3/2004 |
| JP | 5957594 B2 | 7/2016 |

OTHER PUBLICATIONS

Extended European Search Report regarding Application No. 19220062.4 dated Jun. 26, 2020.

* cited by examiner

METHOD FOR CONTROLLING SHUTDOWN WAVE BLOCKING OF MULTILEVEL INVERTER CIRCUIT AND APPLICATION THEREOF

The present application claims priority to Chinese Patent Application No. 201910387311.0, titled "METHOD FOR CONTROLLING SHUTDOWN WAVE BLOCKING OF MULTILEVEL INVERTER CIRCUIT AND APPLICATION APPARATUS THEREOF", filed on May 10, 2019 with the China National Intellectual Property Administration, which is incorporated herein by reference in its entirety.

TECHNICAL FIELD

The present disclosure relates to the technical field of automatic control, and in particular to a method for controlling shutdown wave blocking of a multilevel inverter circuit and an application apparatus for applying the method.

BACKGROUND

FIG. 1a shows a structure of a bridge arm of a multilevel inverter circuit having an ANPC topology. The bridge arm includes six switch tubes, which includes two inner switch tubes T2 and T3, two outer switch tubes T1 and T4, and two clamping switch tubes T5 and T6. Each of the above switch tubes is provided with an anti-parallel diode or a body diode (D1 to D6 shown in FIG. 1a).

In a case that the multilevel inverter circuit changes from an operation state to a shutdown state under control of a controller of an inverter to which the multilevel inverter circuit belongs, the multilevel inverter circuit may adopt a certain switching logic to ensure that a current flowing through the switch tube of the multilevel inverter circuit flows in the circuit in a controlled manner, thereby leading to a rapid drop of the current flowing in the circuit to protect the circuit to be shut down reliably. Then, in a case that a main current drops to zero, all switch tubes in the multilevel inverter circuit are switched to a turn-off state. In this case, due to the existence of the diodes D5 and D6, voltage stresses withstood by the two outer switch tubes T1 and T4 can still be clamped by half of a bus voltage.

However, due to the turning off of the two clamping switch tubes T5 and T6, there is no clamping path for the two inner switch tubes T2 and T3, and if characteristics of the switch tubes in the circuit are different, there will be a large gap between voltage stresses divided between the two inner switch tubes T2 and T3 connected in series after a long time, and then there is a risk of overvoltage.

SUMMARY

According to the present disclosure, a method for controlling shutdown wave blocking of a multilevel inverter circuit and an application apparatus for applying the method are provided, to ensure that voltage stress withstood by each switch tube is within a controlled range.

Technical solutions provided by the present disclosure are as follows.

According to one aspect of the present disclosure, a method for controlling shutdown wave blocking of a multilevel inverter circuit is provided, which includes: after a shutdown command is issued, controlling the multilevel inverter circuit to switch between a free state and a specific turn-on state, where a duration of each free state is less than a first preset time period. The free state is a state in which all switch tubes in the multilevel inverter circuit are turned off. The specific turn-on state is a state in which voltage stress withstood by a switch tube, on which clamping protection is not performed, in the multilevel inverter circuit is zero by controlling a specific combination of switch tubes in the multilevel inverter circuit to be turned on. The first preset time period is a time period in which the voltage stress withstood by the switch tube, on which clamping protection is not performed, in the multilevel inverter circuit in a natural voltage dividing process under the free state reaches a withstand limit.

In an embodiment, after the shutdown command is issued and before controlling the multilevel inverter circuit to switch between the free state and the specific turn-on state, the method further includes: controlling an alternating current output of the multilevel inverter circuit to be a state 0, and controlling a switch tube, on which clamping protection is performed, in the multilevel inverter circuit to withstand a clamping voltage.

In an embodiment, a duration of each specific turn-on state is less than a second preset time period, to ensure that a current flowing through a bridge arm in the specific turn-on state is lower than an overcurrent limit.

In an embodiment, the controlling the multilevel inverter circuit to switch between a free state and a specific turn-on state includes: controlling the multilevel inverter circuit to start from the free state and switch between the free state and the specific turn-on state.

In an embodiment, the specific combinations of switch tubes corresponding to the specific turn-on state at different times are the same or different.

In an embodiment, the specific combination of switch tubes is a bidirectional current clamping switch combination. The bidirectional current clamping switch combination includes at least two selected switch tubes in each bridge arm. The voltage stress withstood by the switch tube, on which clamping protection is not performed, in the multilevel inverter circuit is zero in a case that a state of the multilevel inverter circuit before the multilevel inverter circuit is shut down is a state that current flows out from an alternating current side of the multilevel inverter circuit or a state that current flows into the alternating current side of the multilevel inverter circuit, by turning on the at least two selected switch tubes in each bridge arm.

In an embodiment, the specific combination of switch tubes is a single current clamping switch combination. The single current clamping switch combination includes at most two selected switch tubes in each bridge arm. The voltage stress withstood by the switch tube, on which clamping protection is not performed, in the multilevel inverter circuit is zero in a case corresponding to a state of the multilevel inverter circuit before the multilevel inverter circuit is shut down, by turning on the at most two selected switch tubes in each bridge arm. After the shutdown command is issued, the method for controlling shutdown wave blocking of a multilevel inverter circuit further includes following operation to be performed firstly: identifying whether the state of the multilevel inverter circuit before the multilevel inverter circuit is shut down is a state that current flows out from an alternating current side of the multilevel inverter circuit or a state that current flows into the alternating current side of the multilevel inverter circuit.

In an embodiment, after the shutdown command is issued, the method further includes: after a preset time delay, controlling a disconnecting apparatus arranged between an alternating current side of the multilevel inverter circuit and a voltage source to perform a disconnection operation based on the shutdown command. The preset time delay is greater than or equal to 0 seconds, and is less than a time period during which a total bus voltage is charged to a dangerous value due to multiple times of switching between the specific turn-on state and the free state.

According to another aspect of the present disclosure, an application apparatus for applying a method for controlling shutdown wave blocking of a multilevel inverter circuit is provided, which includes a multilevel inverter circuit and a controller. The controller is configured to perform the above method for controlling shutdown wave blocking of a multilevel inverter circuit.

In an embodiment, the application apparatus is any one of a photovoltaic grid-connected inverter, a shunt active power filter, and a Static Var Generator.

In an embodiment, the multilevel inverter circuit has an active neutral-point-clamped (ANPC) topology or a diode neutral-point-clamped (I-NPC) topology. Switch tubes, on which clamping protection is performed, in the multilevel inverter circuit are two outer switch tubes in a bridge arm, and switch tubes, on which clamping protection is not performed, in the multilevel inverter circuit are two inner switch tubes in the bridge arm.

According to the method for controlling shutdown wave blocking of a multilevel inverter circuit according to the present disclosure, after a shutdown command is issued, the multilevel inverter circuit is controlled to switch between a free state and a specific turn-on state, to destroy the voltage stresses gap between switch tubes on which clamping protection is not performed, accumulated in a natural voltage dividing process under the free state, caused by inconsistent switch tube parameters. The free state is a state in which all switch tubes in the multilevel inverter circuit are turned off. The specific turn-on state is a state in which voltage stress withstood by a switch tube, on which clamping protection is not performed, in the multilevel inverter circuit is zero by controlling a specific combination of switch tubes in the multilevel inverter circuit to be turned on. By performing multiple back-and-forth switching between the free state and the specific turn-on state, voltage stresses withstood by switch tubes, on which clamping protection is not performed, are controlled to be in a controlled range, thereby reducing overvoltage risk caused by inconsistent switch tube parameters.

BRIEF DESCRIPTION OF THE DRAWINGS

In order to more clearly illustrate the technical solutions in the embodiments of the present disclosure or in conventional technology, the drawings used in the description of the embodiments or the conventional technology are briefly described below. Apparently, the drawings in the following description show only some embodiments of the present disclosure, and those skilled in the art can obtain other drawings according to the provided drawings without any creative work.

DETAILED DESCRIPTION OF THE EMBODIMENTS

The technical solutions in the embodiments of the present disclosure are clearly and completely described in the following with reference to the accompanying drawings in the embodiments of the present application. Apparently, the embodiments described here are only a part rather than all of the embodiments of the present application. Based on the embodiments of the present application, all other embodiments obtained by those skilled in the art without creative efforts fall into the scope of the present disclosure.

Figure 1A:
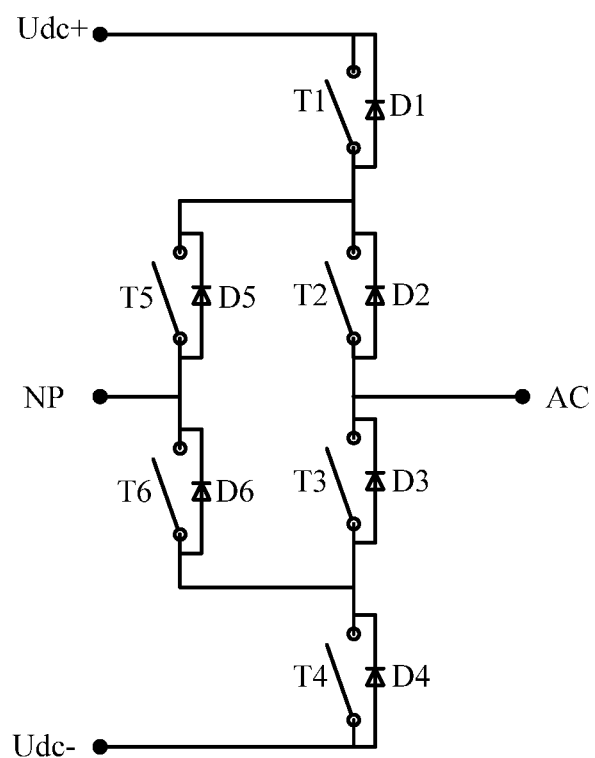
FIG. 1a is a circuit diagram of a structure of a bridge arm of a multilevel inverter circuit having an ANPC topology according to the conventional art.

In a circuit having an ANPC topology as shown in FIG. 1a, an alternating current side AC of the circuit may theoretically output three states: Udc+, NP, and Udc−, which are respectively represented by state 1, state 0, and state −1. In state 1, switch tubes T3 and T4 are connected in series and withstand a total bus voltage. In state −1, switch tubes T1 and T2 are connected in series and withstand the total bus voltage. In normal operation, it is ensured that at least one clamping switch tube (T5, D5 and T6, D6) is in a turn-on state, and a voltage at point NP is generally considered to be half of the bus voltage, thus voltage stress withstood by each switch tube may be effectively controlled at half of the bus voltage. However, in an abnormal state such as shutdown protection, if all the switch tubes are turned off, the system is naturally in state 1 or state −1 based on a direction of a current. In this case, if the clamping switch tubes are turned off, voltage stresses withstood by outer switch tubes can still be clamped at half of the bus voltage due to existence of diodes D5 and D6, and since there is no clamping path for inner switch tubes T2 and T3, there is a risk of overvoltage.

Figure 2A:
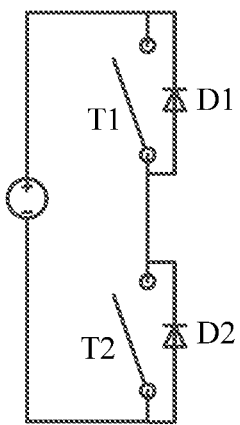
FIG. 2a is a schematic diagram of a physical model of serial switch tubes withstanding voltage stress according to an embodiment of the present disclosure.
Figure 2B:
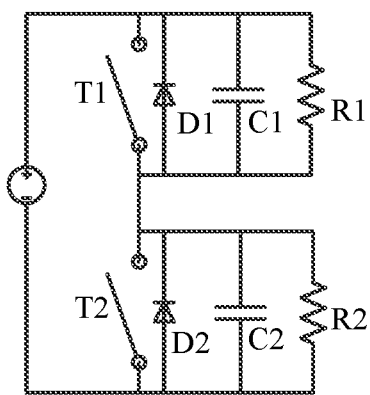
FIG. 2b and FIG. 2c are equivalent schematic diagrams of the physical model of serial switch tubes withstanding voltage stress according to an embodiment of the present disclosure.
Figure 2C:
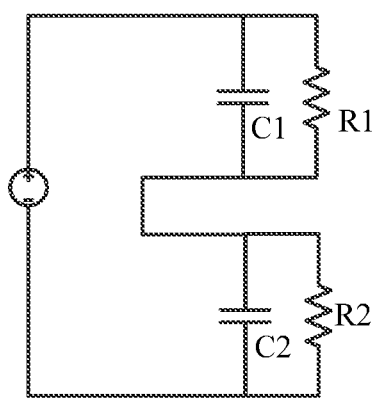

Voltage stresses divided among switch tubes connected in series are generally determined by equivalent parallel capacitances, leakage currents, and equivalent parallel resistances of the switch tubes, and are related to tailing currents of the switch tubes if the switch tubes or part of the switch tubes are configured as IGBTs. In order to facilitate analysis, a variable resistor is adopted to replace total effects of the equivalent parallel resistances, switch tube leakage currents, anti-parallel diode leakage currents, and tail currents. It is assumed that in an initial state, voltage stresses withstood by two switch tubes are equal, and voltage stress divided between the two switch tubes are gradually changed due to influence of parasitic parameters, and then one of the switch tubes is damaged due to excessive voltage stress. Therefore, a physical model of the serial switch tubes (shown in FIG. 2a) is equivalent to a structure in which ideal switch tubes (T1 and T2 shown in FIG. 2b) and diodes (D1 and D2 shown in FIG. 2b) are connected in parallel with resistors and capacitors (R1, R2, C1, and C2 shown in FIG. 2b). In addition, if the ideal switch tubes and the diodes are removed in a case that the serial switch tubes are in a turn-off state, the physical model of the serial switch tubes may be equivalent to a voltage dividing structure including resistors and capacitors (R1, R2, C1, and C2 shown in FIG. 2c). It is assumed that in the initial state, voltages distributed on the switch tubes T1 and T2 are the same by performing a certain timing processing, and then the voltages on the switch tubes T1 and T2 are to be naturally re-divided. Assuming a total voltage is U, a voltage across the switch tube T1 is U1, and a voltage across the switch tube T2 is U2, based on circuit principles, final voltages divided between the switch tubes T1 and T2 can be obtained based on the following equations:

$$U1 = \frac{R1}{R1 + R2} \times U$$

$$U2 = \frac{R2}{R1 + R2} \times U$$

If resistance values of the equivalent resistors R1 and R2 are greatly different, one of the switch tubes may be damaged due to an excessive voltage. However, a certain time is required to reach a final state, which is related to a time constant $$\tau = \frac{R1 \times R2}{R1 + R2} \times (C1 + C2)$$

of an equivalent circuit. Generally, the time constant calculated based on equivalent parameters of the switch tubes is in a millisecond magnitude or a second magnitude. Therefore, it takes a relatively long time to reach a steady state based on the above equations for obtaining final voltages, and the natural voltage dividing process can be destroyed by performing proper switching operations before the voltage divided for the serial switch tube reaches a dangerous voltage, thereby protecting the components.

Based on the above analysis, a method for controlling shutdown wave blocking of a multilevel inverter circuit is provided according to the present disclosure, to ensure that voltage stress withstood by each switch tube is within a controlled range.

Figure 3A:
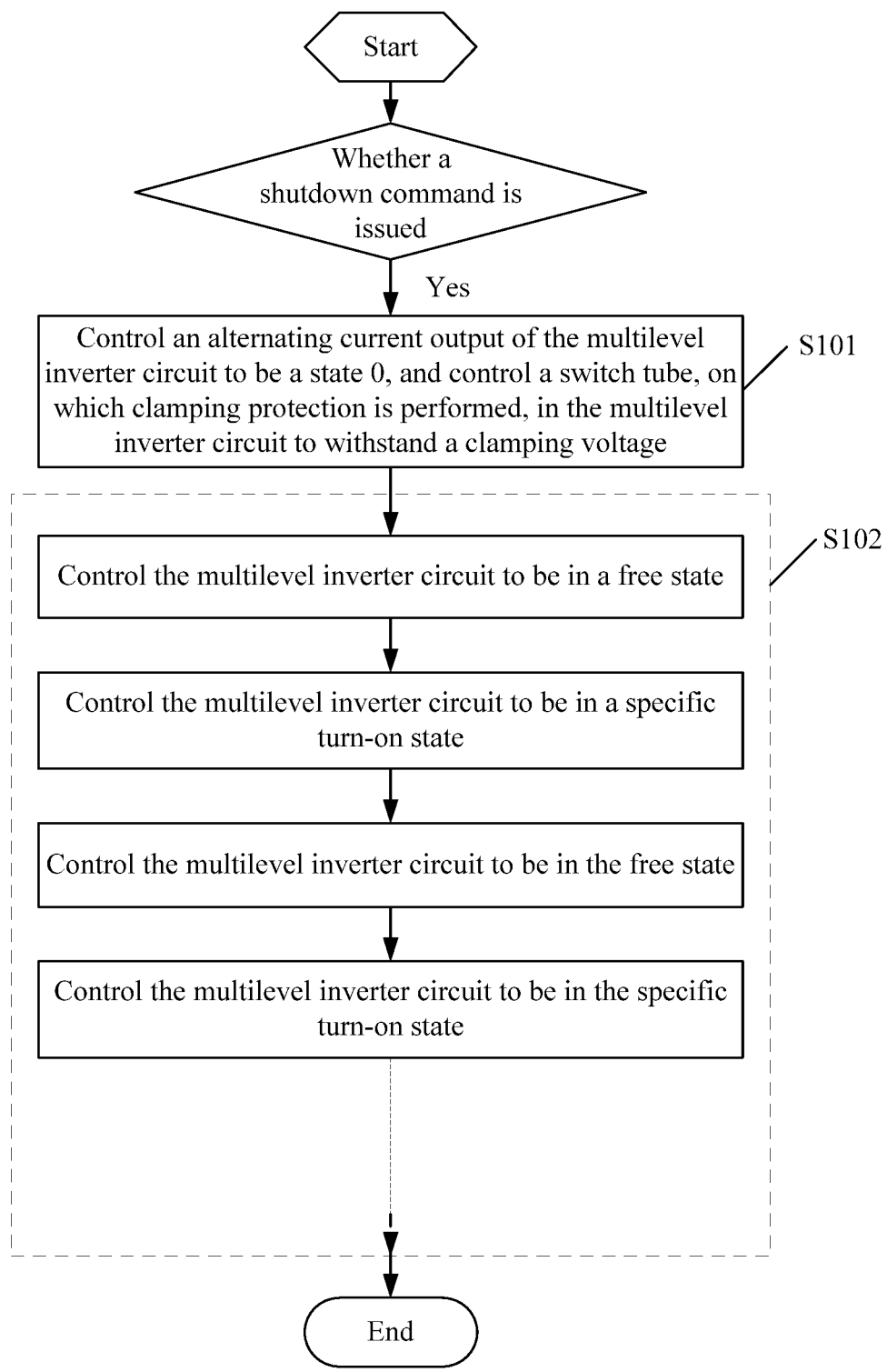
FIG. 3a and FIG. 3b are two flow charts of a method for controlling shutdown wave blocking of a multilevel inverter circuit according to an embodiment of the present disclosure.

Specifically, referring to FIG. 3a, a method for controlling shutdown wave blocking of a multilevel inverter circuit includes the following steps S101 and S102. After a shutdown command is issued, step S101 is performed first, and then step S102 is performed.

In step S101, an alternating current output of the multilevel inverter circuit is controlled to be a state 0, and a switch tube, on which clamping protection is performed, in the multilevel inverter circuit is controlled to withstand a clamping voltage.

Taking the circuit having an ANPC topology shown in FIG. 1a as an example, the switch tubes, on which clamping protection is performed, are two outer switch tubes T1 and T4, and the clamping voltage is half of a bus voltage. Therefore, in step S101, the alternating current output of the multilevel inverter circuit is controlled to be a state 0 by a switch tube combination, and voltages withstood by the outer switch tubes T1 and T4 are ensured to be half of the bus voltage, avoiding that the corresponding switch tubes withstand higher voltages if the alternating current output is a state 1 or a state −1 in a subsequent control process.

It should be noted that, after the shutdown command is issued, step S101 may be omitted and step S102 may be directly performed. It is a more preferred solution of performing step S101 firstly and then performing step S102. In practice, how to perform the steps is not limited to the above manners, and depends on the application environment, and is still within the protection scope of the present disclosure.

In step S102, the multilevel inverter circuit is controlled to switch between a free state and a specific turn-on state. A duration of each free state is less than a first preset time period.

The free state is a state in which all switch tubes in the multilevel inverter circuit are turned off. Taking the circuit having an ANPC topology shown in FIG. 1a as an example, the free state is a state in which all the six switch tubes are turned off, and a loop current is freewheeled by anti-parallel diodes or parasitic diodes, or the switch in parallel with the diode for freewheeling may be intentionally turned on for synchronous rectification, which is not specifically limited here, depends on the application environment, and is still within the protection scope of the present disclosure.

The specific turn-on state is a state in which voltage stress withstood by a switch tube, on which clamping protection is not performed, in the multilevel inverter circuit is zero by controlling a specific combination of switch tubes in the multilevel inverter circuit to be turned on. Taking the circuit having an ANPC topology shown in FIG. 1a as an example, the switch tubes, on which clamping protection is not performed, are the two inner switch tubes T2 and T3, and the specific turn-on state is a state in which a predetermined specific combination of switch tubes are controlled to be turned on in a short time to ensure that the outer switch tubes T1 and T4 withstand half of the bus voltage and the voltage withstood by the inner switch tubes T2 and T3 is zero. In addition, each time entering the specific turn-on state, the specific combination of switch tubes may be the same or be adjusted as required.

Step S102 is controlled to be performed back-and-forth between the free state and the specific turn-on state multiple times. In practice, the step S102 may be performed with starting from the free state. The duration of each state may be the same or different. As long as the duration of each free state is ensured to be less than the first preset time period, the natural voltage dividing process can be destroyed, thereby protecting the components. The first preset time period is a time period in which the voltage stress withstood by the switch tube, on which clamping protection is not performed, in the multilevel inverter circuit in a natural voltage dividing process under the free state reaches a withstand limit.

According to the method for controlling shutdown wave blocking of a multilevel inverter circuit according to the present disclosure, after a shutdown command is issued, the multilevel inverter circuit is controlled to switch between a free state and a specific turn-on state, to destroy the voltage stresses gap between switch tubes on which clamping protection is not performed, accumulated in a natural voltage dividing process under the free state, caused by inconsistent switch tube parameters. By performing multiple back-and-forth switching between the free state and the specific turn-on state, voltage stresses withstood by switch tubes, on which clamping protection is not performed, are controlled to be in a controlled range, reducing overvoltage risk caused by inconsistent switch tube parameters. That is, with the method in the embodiment, it is avoided that the voltage stress withstood by the switch tube in the system exceeds a limit range due to stray parameters and then an equipment is damaged, in this way, the reliability of the system is increased.

Figure 1B:
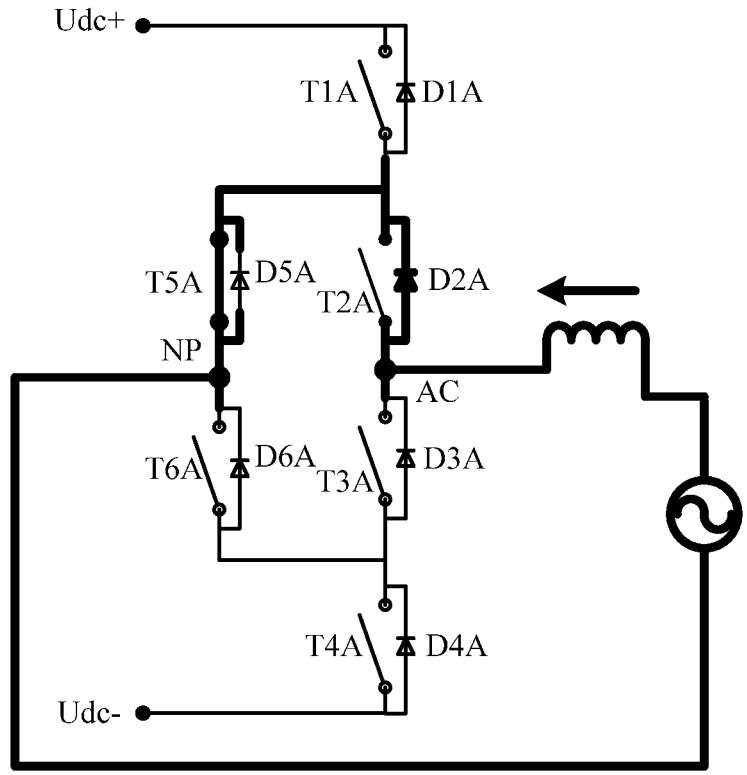
FIG. 1b is a schematic diagram showing a direction of a current flowing through a bridge arm of a multilevel inverter circuit having an ANPC topology according to the conventional art.

It should be noted that, for the topology shown in FIG. 1a, when performing shutdown wave blocking in the conventional art, the clamping switch tubes T5 and T6 may be controlled to be turned off after a certain delay. However, in a system (such as an application system of a photovoltaic grid-connected inverter, and multiple alternating current shunt active power filters and Static Var Generator) having a voltage source at an alternating current side, if the delay of the clamping switch tubes T5 and T6 to be turned off are too long, the voltage source at the alternating current side is connected to an inductor, an diode, and a clamping switch tube at power grid side to form a short circuit (as shown by the thick solid line in FIG. 1b), and then the current rises rapidly in a reverse direction, damaging the equipment. FIG. 1b shows a short circuit state in a single-bridge structure. Short circuit states in a two-phase bridge structure and a three-phase bridge structure are similar to the short circuit state in the single-bridge structure, and are not described again.

Therefore, a method for controlling shutdown wave blocking of a multilevel inverter circuit is provided according to another embodiment of the present disclosure. Based on the previous embodiment, more preferably, a duration of each specific turn-on state is less than a second preset time period, to ensure that a current flowing through a bridge arm in the specific turn-on state is lower than an overcurrent limit.

By setting the second preset time period, the predetermined specific combination of switch tubes are turned on for only a short time period in the above system having a voltage source at the alternating current side. Therefore, a voltage pulse superimposed on an inductor at the alternating current side is a high-frequency voltage signal, thereby effectively limiting a current at an output side of the bridge arm and protecting related components from failure due to overcurrent.

Figure 4A:
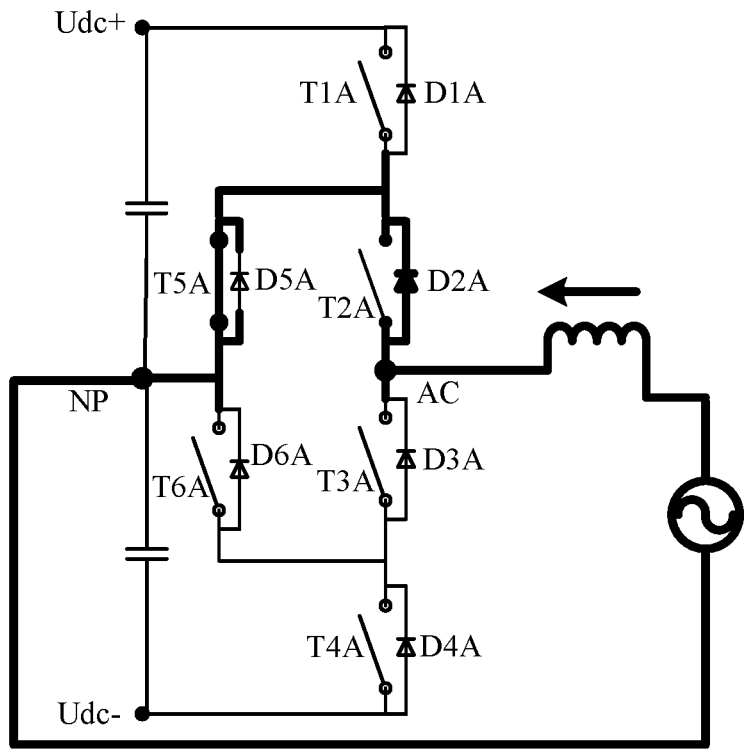
FIG. 4a and FIG. 4b are schematic diagrams showing a direction of a current flowing through a bridge arm of a multilevel inverter circuit having an ANPC topology according to an embodiment of the present disclosure.
Figure 4B:
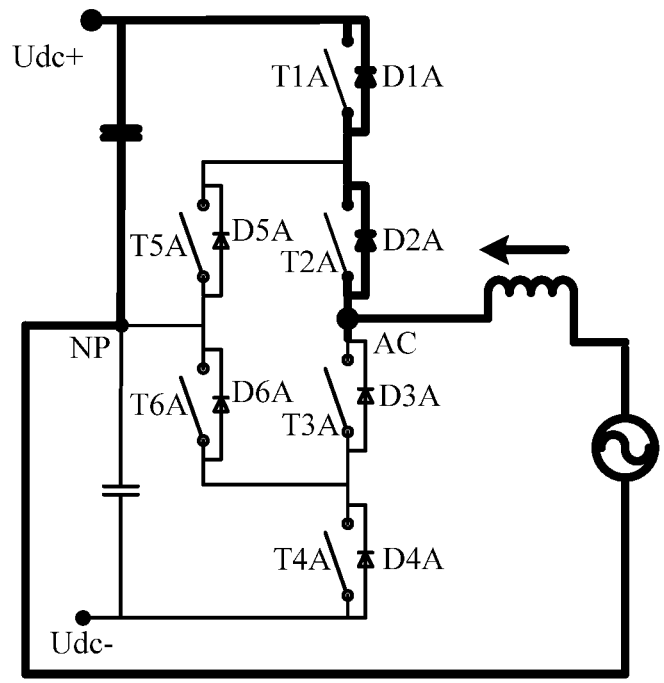

As shown by the thick solid lines in FIGS. 4a and 4b, the circuit is in BOOST operating mode for the alternating current side. In practice, the predetermined specific combination of switch tubes is repeatedly turned off and on in a certain timing sequence by selecting a suitable duty cycle, thereby avoiding rapid current rise and damage to the equipment caused by a long time short circuit in the system having a voltage source at the alternating current side.

The remaining principles are the same as those in the previous embodiments, and are not described again.

It should be further explained that the circuits shown in FIGS. 4a and 4b are in BOOST operating mode for the alternating current side, which causes a problem that a bus voltage is to be increased in the system having a voltage source at the alternating current side. Therefore, it is required to deal with the problem to enhance the applicability of the above solution.

In practice, in the system having a voltage source at the alternating current side, a disconnecting apparatus such as a relay, a contactor, and an electronic switch is usually connected in series to the alternating current side. Since operation delays of some disconnecting apparatuses may reach millisecond magnitude, the disconnecting apparatus fails to disconnect in time after a system shutdown command is received. Therefore, the solution described in the above embodiment should be matched with the disconnecting apparatus to perform a logic switching to protect the reliable operation of the system.

Figure 3B:
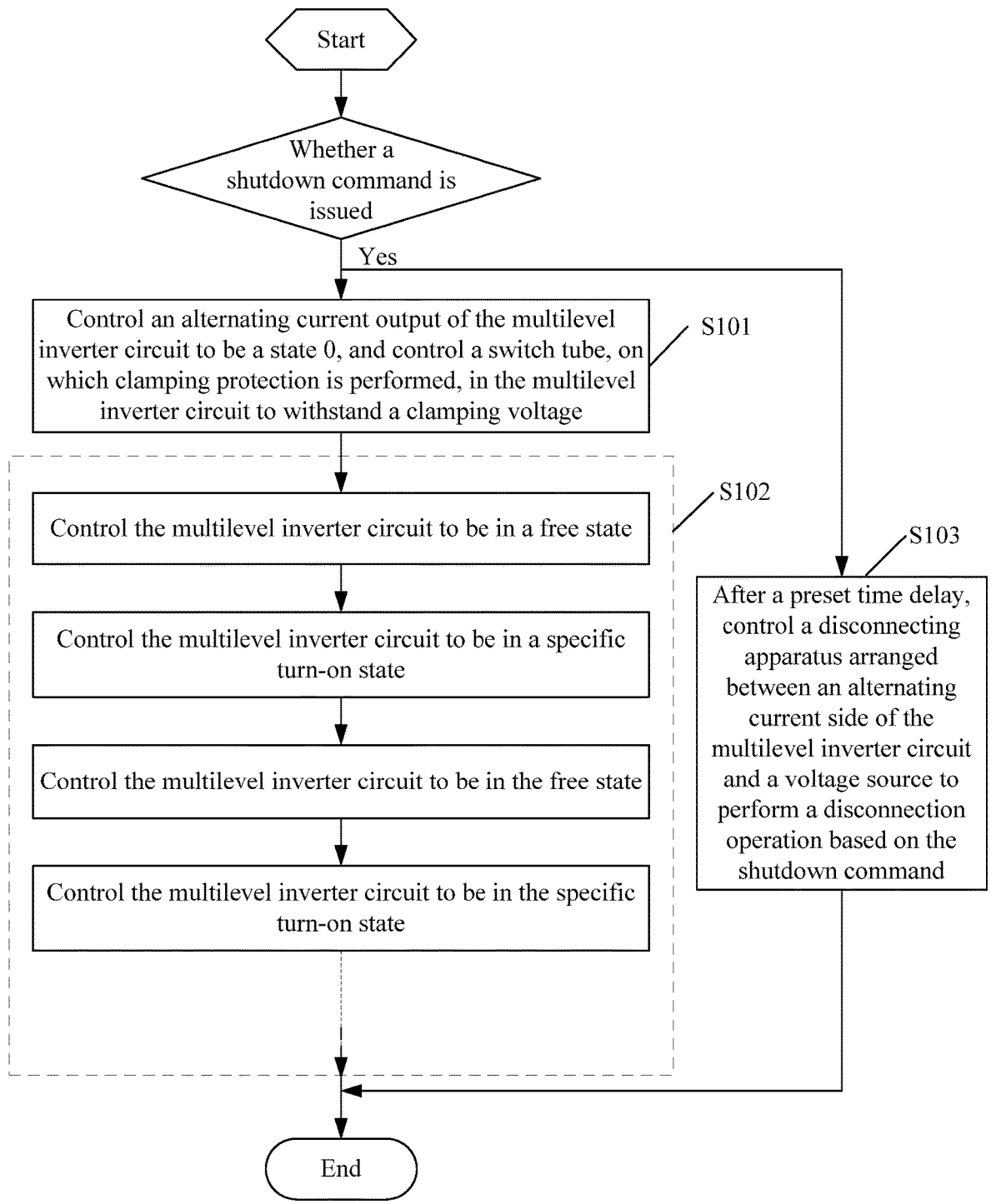

Therefore, a method for controlling shutdown wave blocking of a multilevel inverter circuit is provided according to another embodiment. Based on the above embodiments and FIG. 3a, as shown in FIG. 3b, after the shutdown command is issued, the method further includes step S103. In step S103, after a preset time delay, a disconnecting apparatus arranged between an alternating current side of the multilevel inverter circuit and a voltage source is controlled to perform a disconnection operation based on the shutdown command.

Step S103 includes: after the preset time delay, sending a turning off command to the disconnecting apparatus based on the shutdown command, and reliably performing a disconnection process by the disconnecting apparatus.

In practice, the preset time delay should be set to ensure the issue of the turning off command. That is, the preset time delay should be greater than or equal to 0 seconds, thereby meeting requirements of corresponding regulations. The preset time delay does not cause the circuit to switch back-and-forth between the free state and the specific turn-on state multiple times to charge the bus for a longer time and therefore resulting in the total bus voltage exceeding a dangerous value. Specific value of the preset time delay is not limited, and may depend on application environment, and is within the protection scope of the present disclosure.

The remaining principles are the same as those in the previous embodiments, and are not described again.

A method for controlling shutdown wave blocking of a multilevel inverter circuit is provided according to another embodiment of the present disclosure. Based on the above embodiments, several specific implementations of the specific combination of switch tubes are provided.

Taking the circuit having an ANPC topology shown in FIG. 1a as an example, the specific combination of switch tubes includes at least one of the four switch tubes T2, T3, T5 and T6. That is, the specific turn-on state is a state in which at least one of the four switch tubes T2, T3, T5 and T6 is in a turn-on state. $2^4=16$ combinations of switch tubes may be obtained by listing the states of the four switch tubes, where an all-zero state is the free state, and some of the other fifteen combinations of switch tubes may form a specific combination of switch tubes required in a specific situation, and some of the other fifteen combinations of switch tubes may meet the requirements of the specific combination of switch tubes in any situations. Therefore, these combinations of switch tubes are classified as shown in Table 1, with a single current clamping switch combination, a corresponding switch tube in a specific current direction may be clamped, and with a bidirectional current clamping switch combination, a corresponding switch tube in any current direction may be clamped.

TABLE 1

|  | zero switch tubes are turned on | One switch tube is turned on | | | | Two switch tubes are turned on | | | | | | Three switch tubes are turned on | | | | Four switch tubes are turned on |
| --- | --- | --- | --- | --- | --- | --- | --- | --- | --- | --- | --- | --- | --- | --- | --- | --- |
|  | Free state | Single current clamping switch combination | | | | Bidirectional current clamping switch combination | | | | | | | | | | |
| T2 | 0 | 1 | 0 | 0 | 0 | 1 | 0 | 1 | 0 | 1 | 0 | 1 | 1 | 1 | 0 | 1 |
| T3 | 0 | 0 | 1 | 0 | 0 | 0 | 1 | 0 | 1 | 1 | 0 | 1 | 1 | 0 | 1 | 1 |
| T5 | 0 | 0 | 0 | 1 | 0 | 1 | 0 | 0 | 1 | 0 | 1 | 1 | 0 | 1 | 1 | 1 |
| T6 | 0 | 0 | 0 | 0 | 1 | 0 | 1 | 1 | 0 | 0 | 1 | 0 | 1 | 1 | 1 | 1 |
| state code | 0 | 1 | 2 | 4 | 8 | 5 | 10 | 9 | 6 | 3 | 12 | 7 | 11 | 13 | 14 | 15 |

Figure 5A:
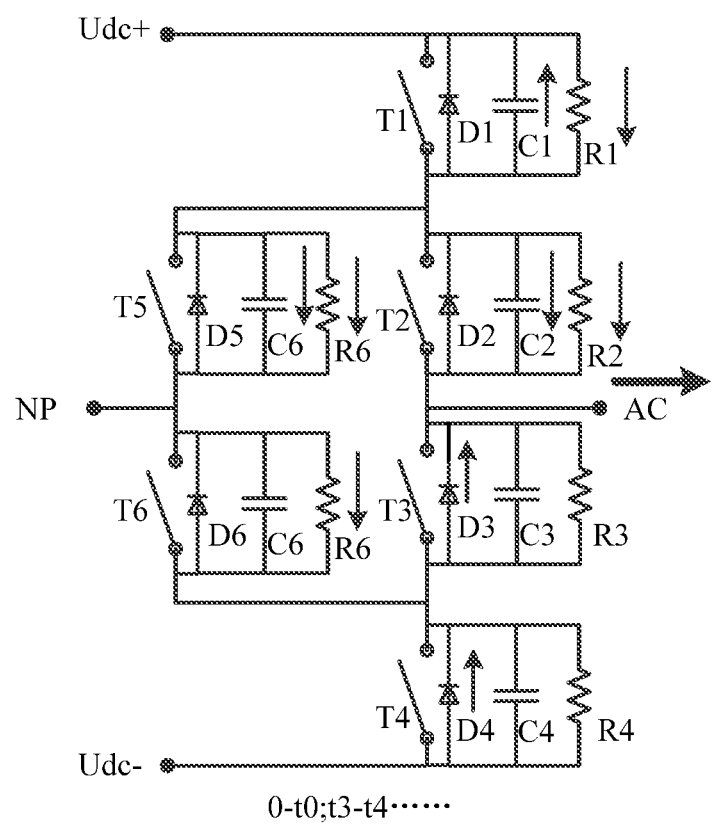
FIG. 5a to FIG. 5d are schematic diagrams showing a direction of a current flowing through a bridge arm of a multilevel inverter circuit having an ANPC topology in a case the bridge arm is controlled based on a state code 12 and the current is flowing outward according to an embodiment of the present disclosure.
Figure 5B:
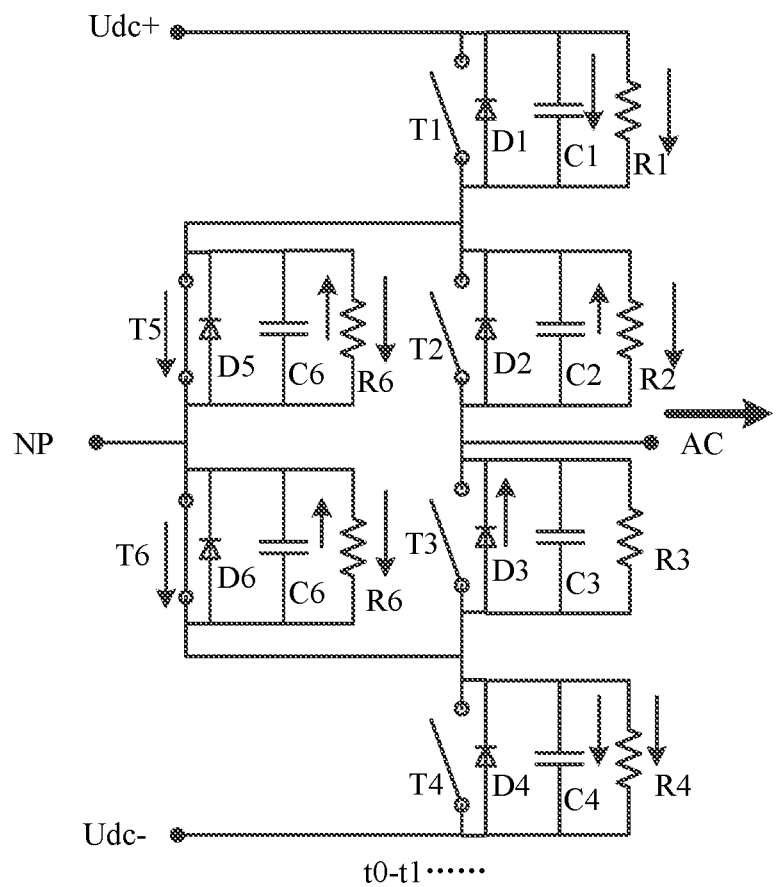
Figure 5C:
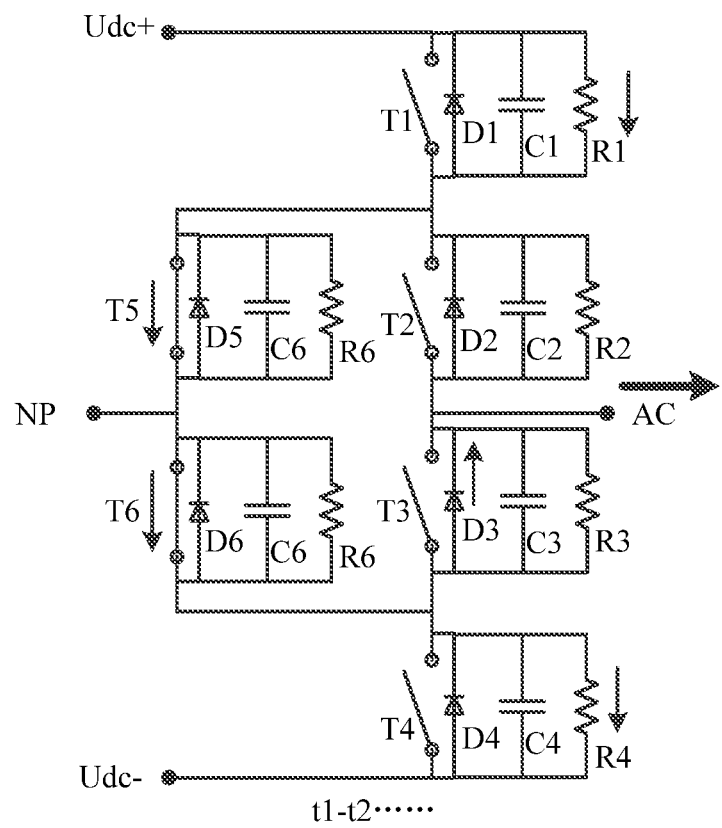
Figure 5D:
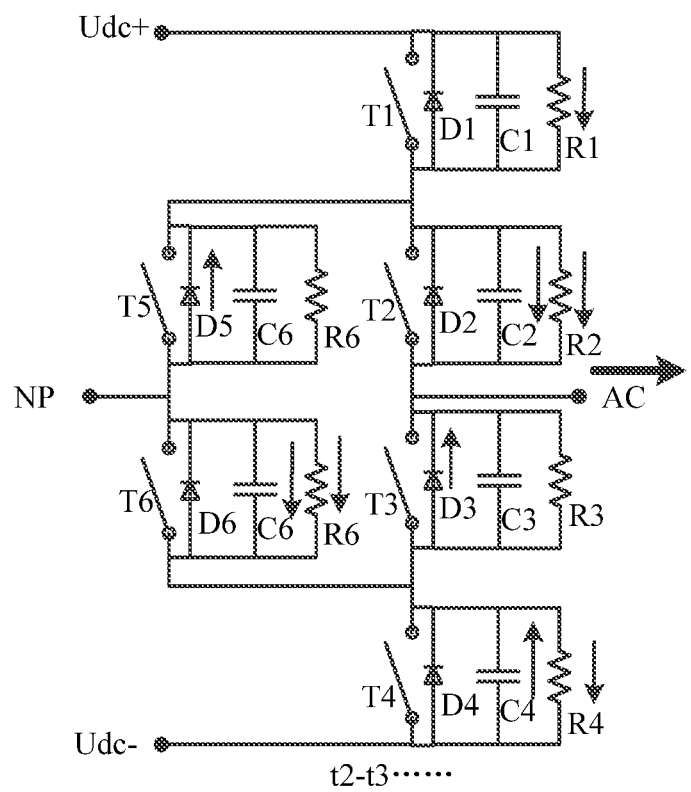
Figure 6:
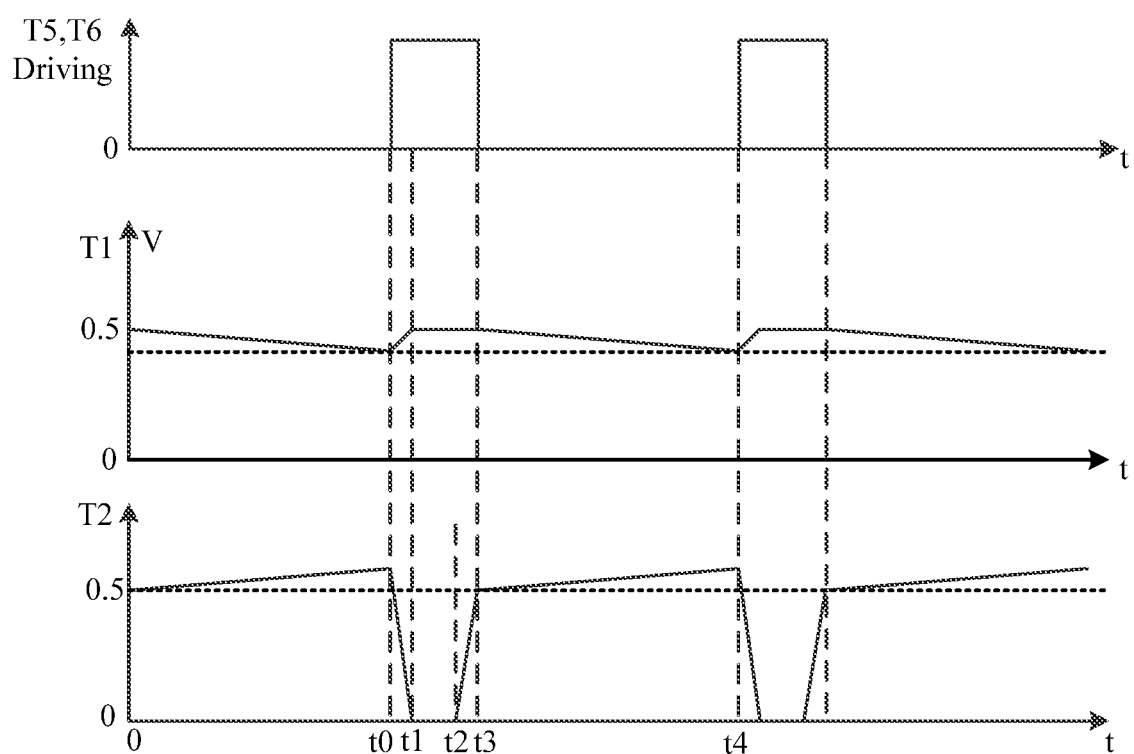
FIG. 6 is a schematic diagram shows timings and waveforms of voltage stresses in the circuit shown in FIG. 5a to FIG. 5d.
Figure 7A:
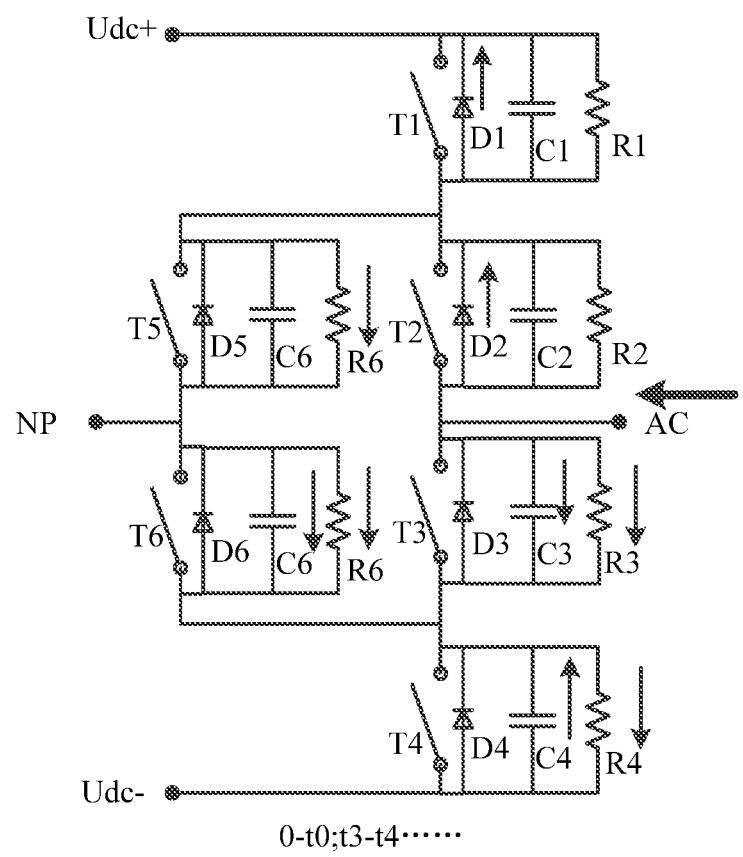
FIG. 7a to FIG. 7d are schematic diagrams showing a direction of a current flowing through a bridge arm of a multilevel inverter circuit having an ANPC topology in a case the bridge arm is controlled based on a state code 12 and the current is flowing inward according to an embodiment of the present disclosure.
Figure 7B:
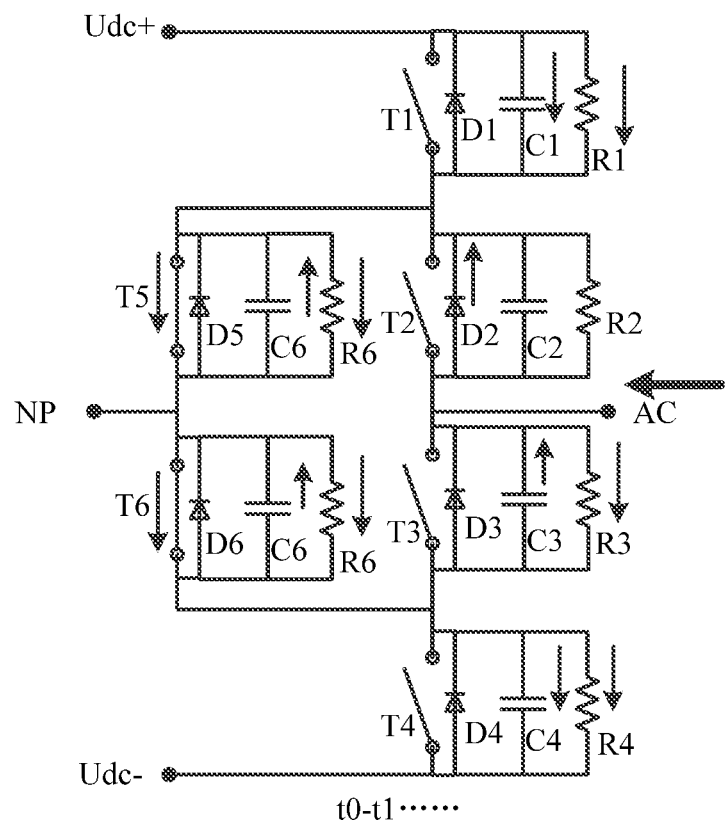
Figure 7C:
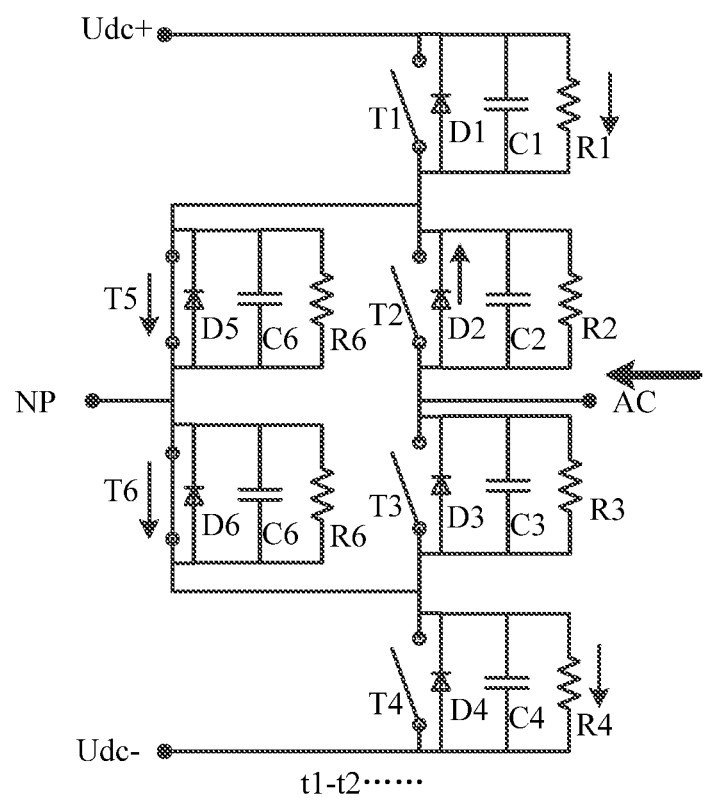
Figure 7D:
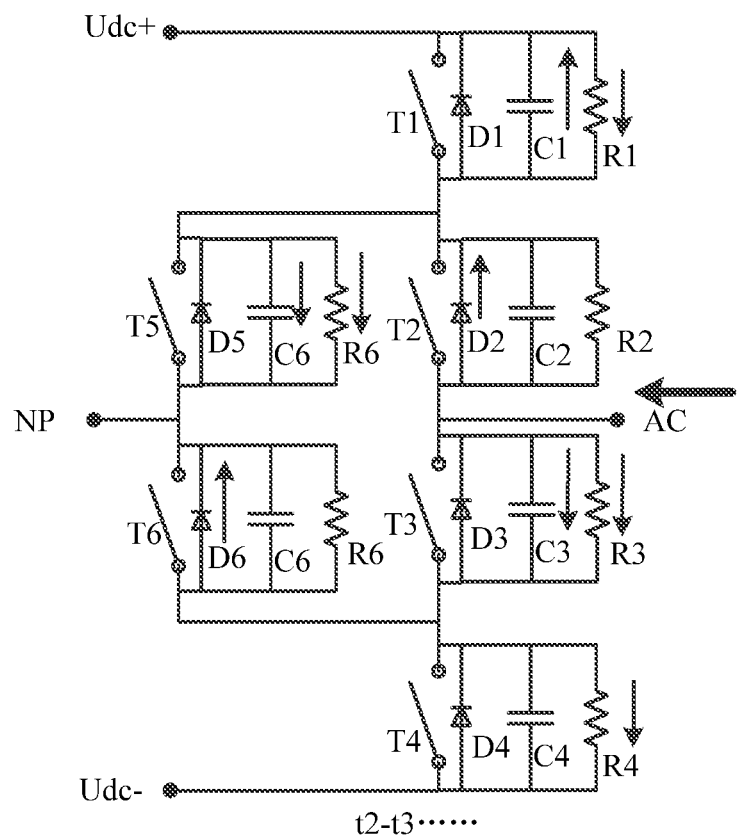
Figure 8:
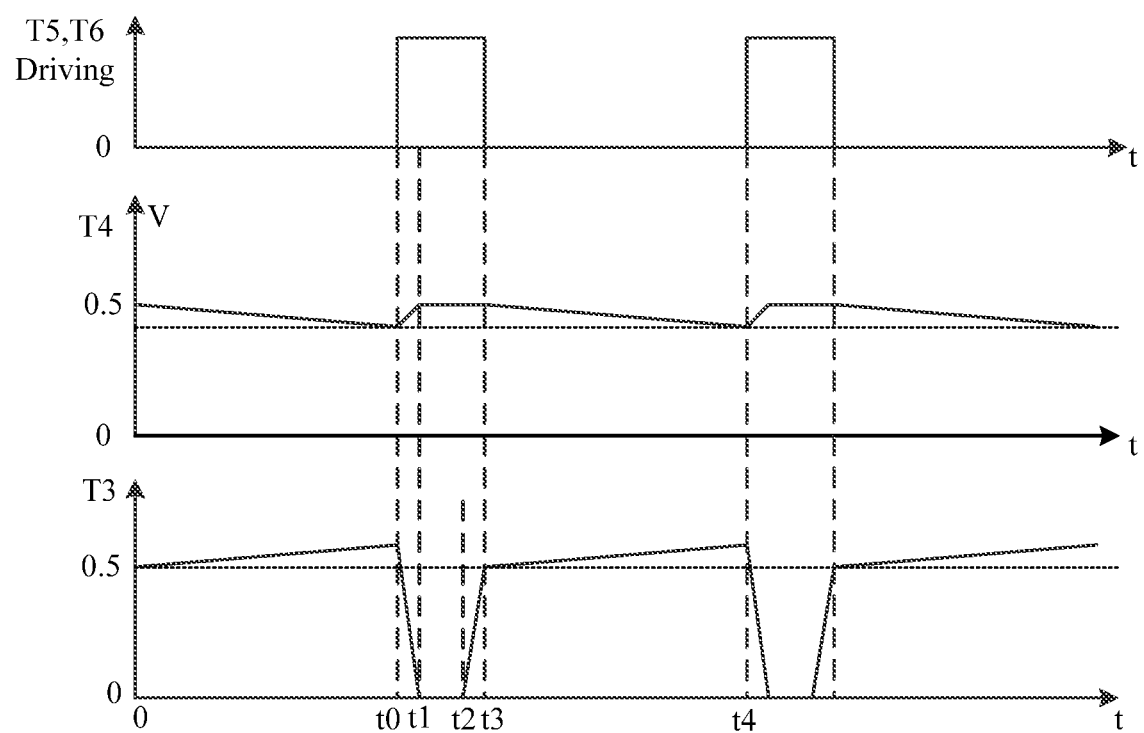
FIG. 8 is a schematic diagram shows timings and waveforms of voltage stresses in the circuit shown in FIG. 7a to FIG. 7d.

A bidirectional current clamping switch combination based on the state code 12 is taken as an example to explain how to clamp an inner switch tube. FIGS. 5a to 5d show directions of a steady state current and a dynamic current flowing through all switch tubes and a switching process in a case that the current is flowing outward. FIG. 6 is a schematic diagram shows timings and waveforms of voltage stresses in the circuit shown in FIG. 5a to FIG. 5d. In each cycle, FIG. 5a is a schematic diagram showing the directions of the currents in a time period from 0 to t0 and a time period from t3 to t4, FIG. 5b is a schematic diagram showing the directions of the currents in a time period from t0 to t1, FIG. 5c is a schematic diagram showing the directions of the currents in a time period from t1 to t2, and FIG. 5d is a schematic diagram showing the directions of the currents in a time period from t2 to t3. FIGS. 7a to 7d show directions of a steady state current and a dynamic current flowing through all switch tubes and a switching process in a case that the currents is flowing inward. FIG. 8 is a schematic diagram shows timings and waveforms of voltage stresses in the circuit shown in FIG. 7a to FIG. 7d. In each cycle, FIG. 7a is a schematic diagram showing the directions of the currents in a time period from 0 to t0 and a time period from t3 to t4, FIG. 7b is a schematic diagram showing the directions of the currents in a time period from t0 to t1, FIG. 7c is a schematic diagram showing the directions of the currents in a time period from t1 to t2, and FIG. 7d is a schematic diagram showing the directions of the currents in a time period from t2 to t3. It can be seen from the waveform diagrams that voltages across the outer switch tubes T1 and T4 will rise when the outer switch tubes T1 and T4 are in the free state, and if rising time is too long, the outer switch tubes T1 and T4 will be damaged due to overvoltage.

Figure 9A:
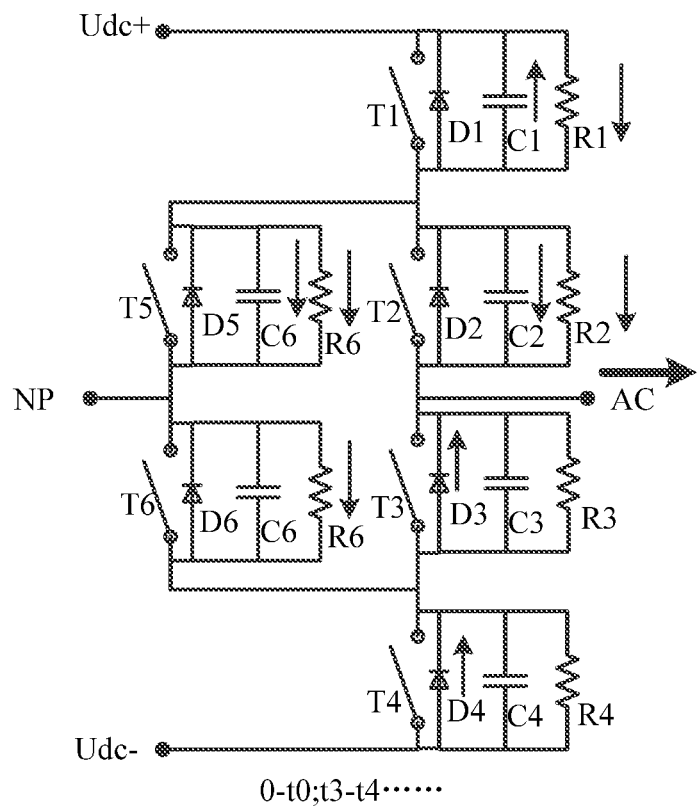
FIG. 9a to FIG. 9d are schematic diagrams showing a direction of a current flowing through a bridge arm of a multilevel inverter circuit having an ANPC topology in a case the bridge arm is controlled based on a state code 5 and the current is flowing outward according to an embodiment of the present disclosure.
Figure 9B:
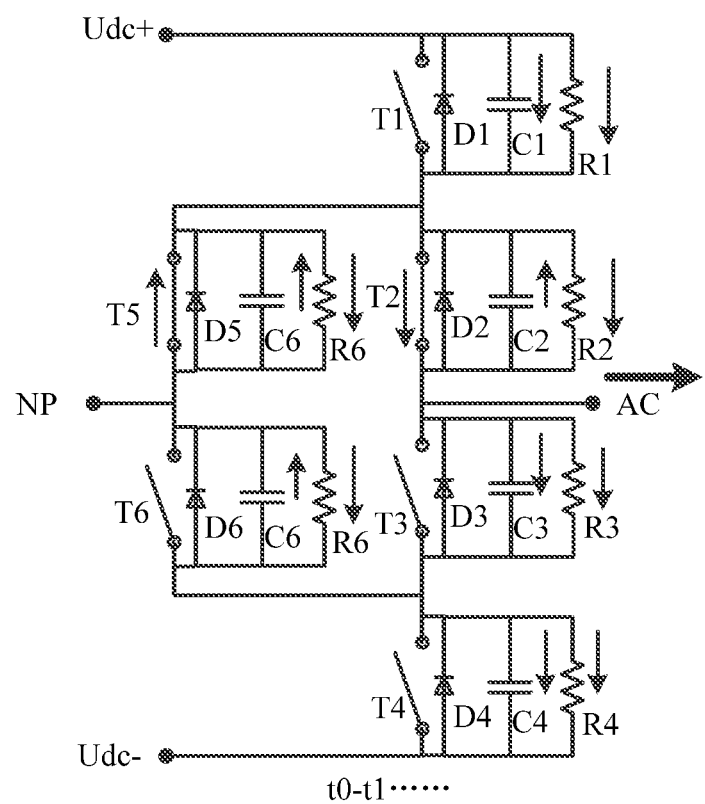
Figure 9C:
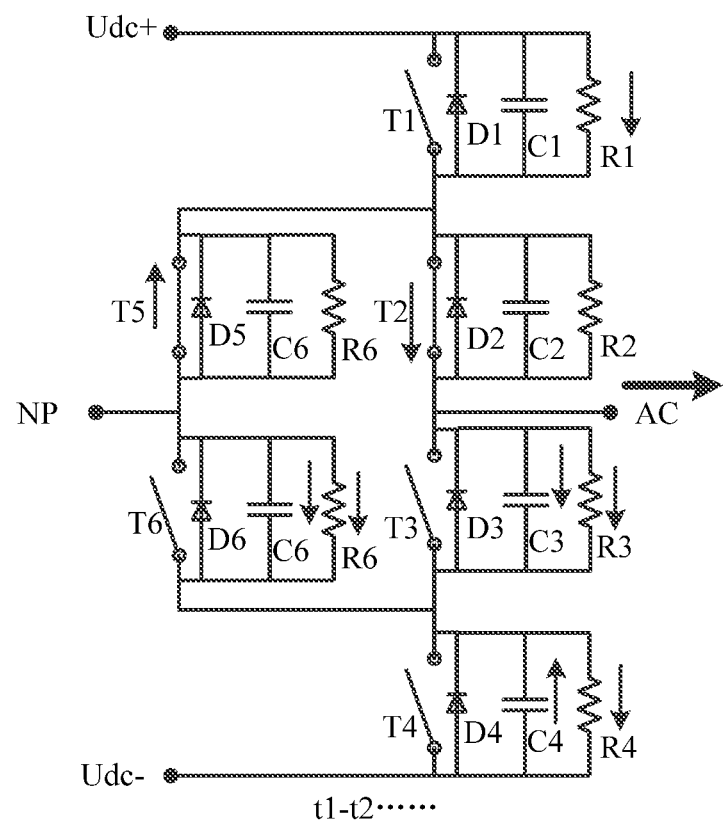
Figure 9D:
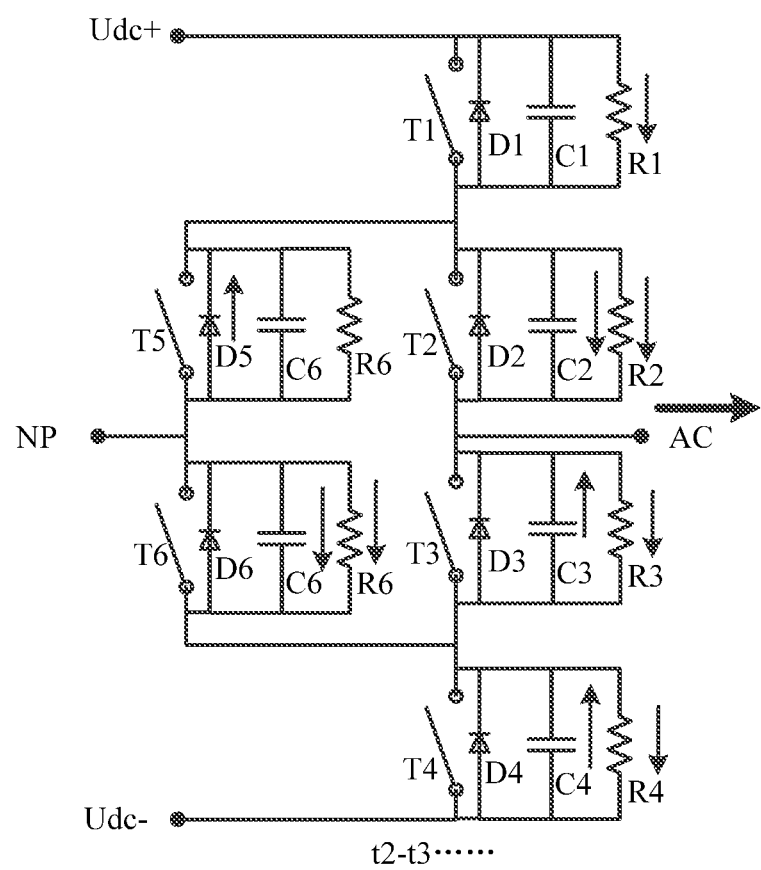
Figure 10:
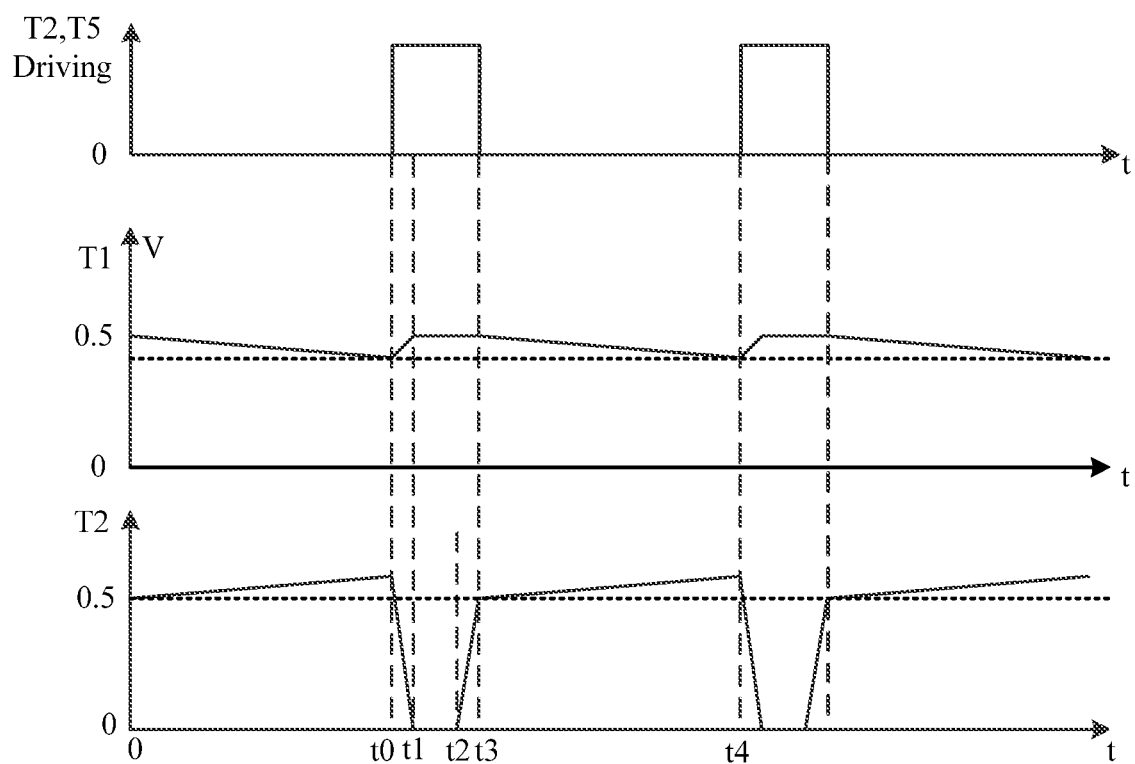
FIG. 10 is a schematic diagram shows timings and waveforms of voltage stresses in the circuit shown in FIG. 9a to FIG. 9d.
Figure 11A:
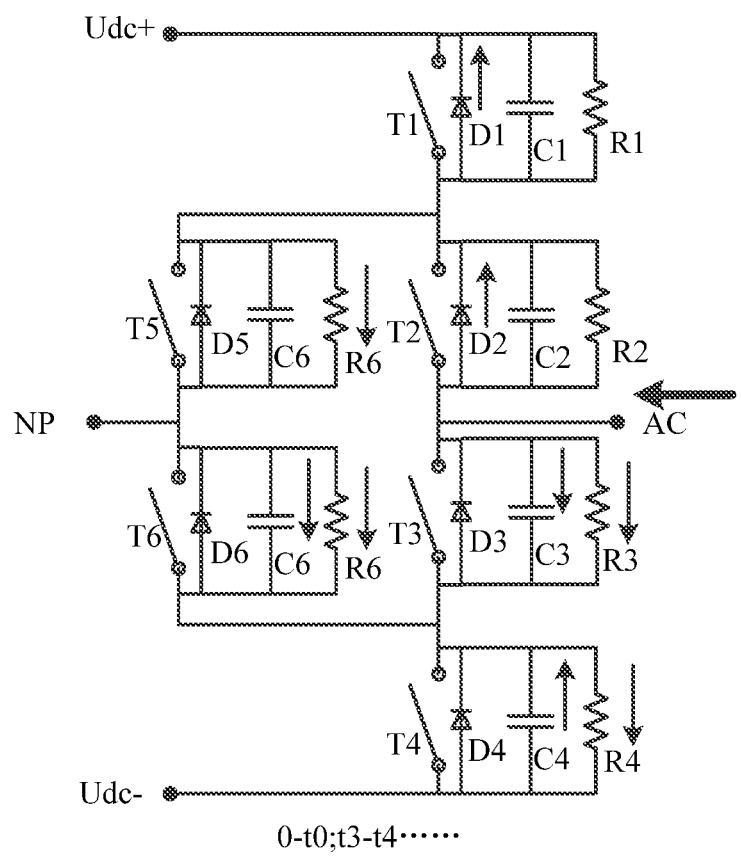
FIG. 11a to FIG. 11d are schematic diagrams showing a direction of a current flowing through a bridge arm of a multilevel inverter circuit having an ANPC topology in a case the bridge arm is controlled based on a state code 5 and the current is flowing inward according to an embodiment of the present disclosure.
Figure 11B:
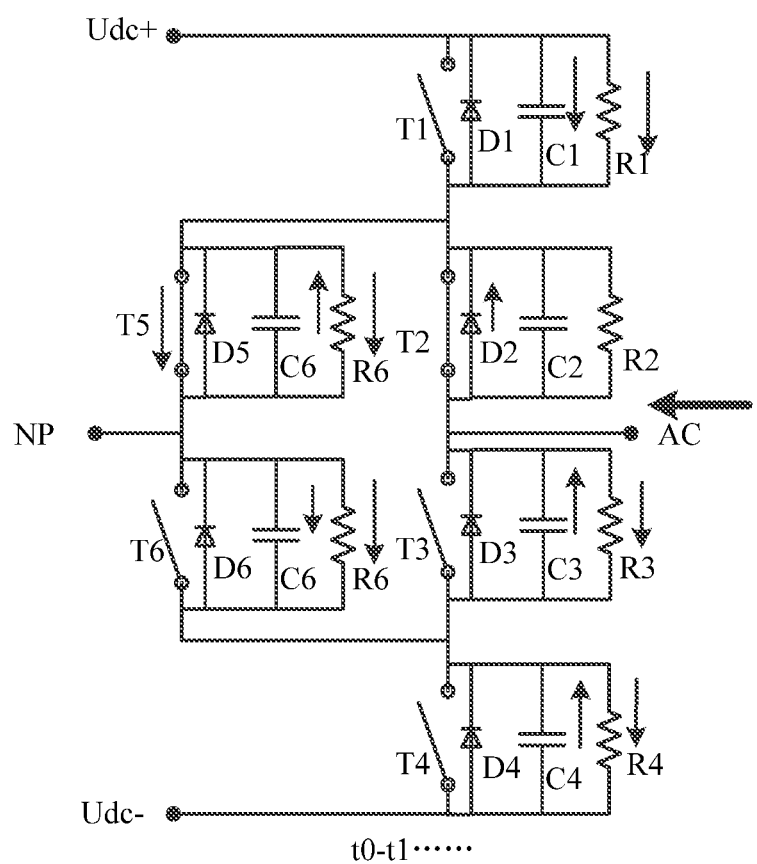
Figure 11C:
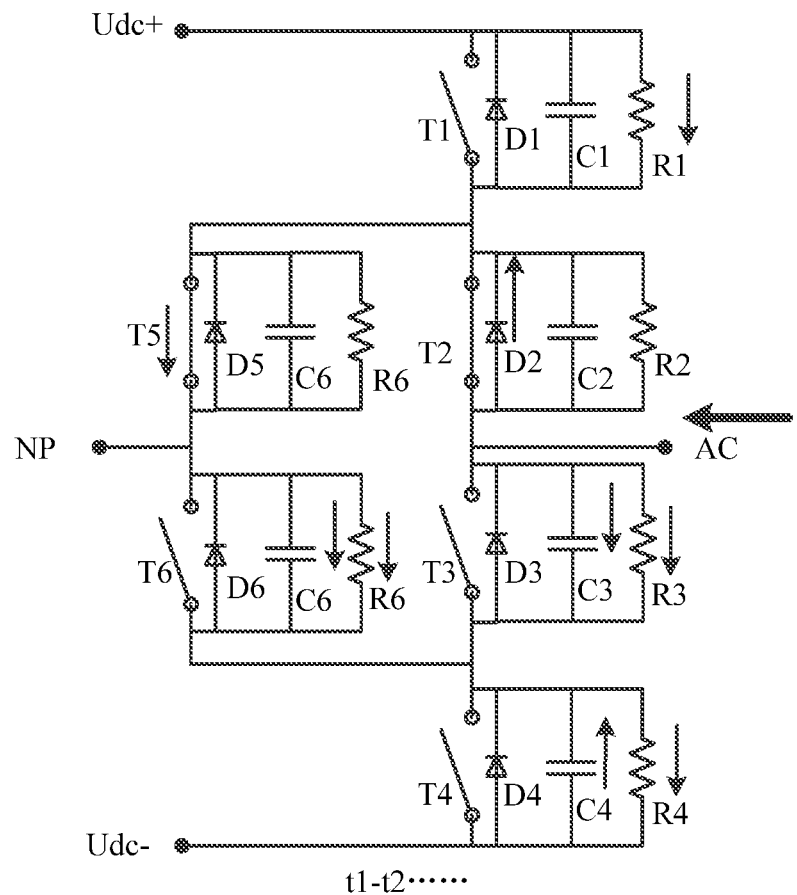
Figure 11D:
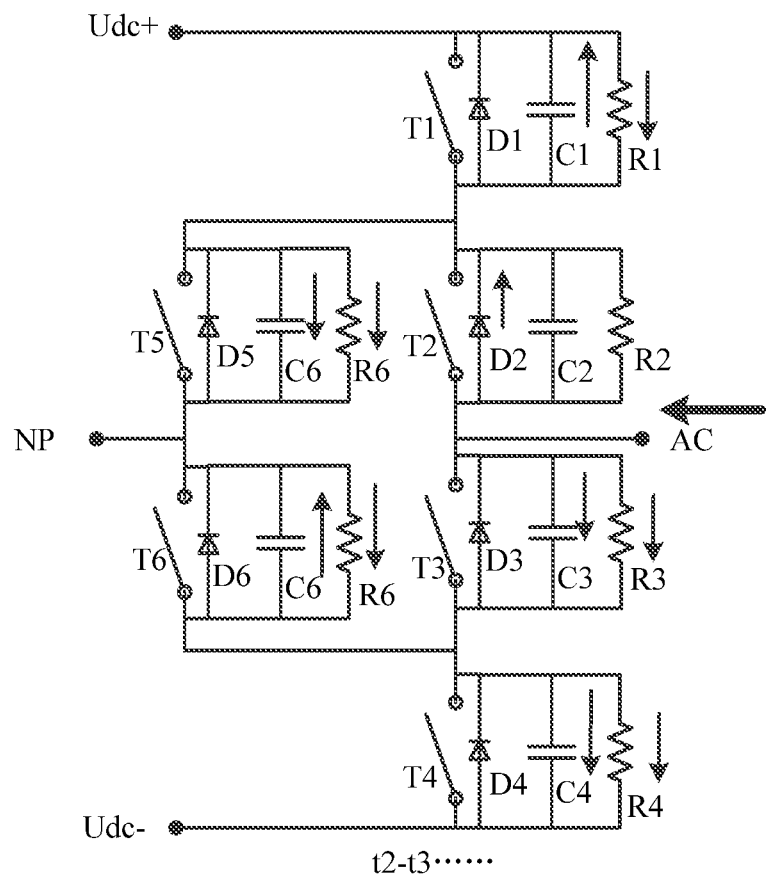
Figure 12:
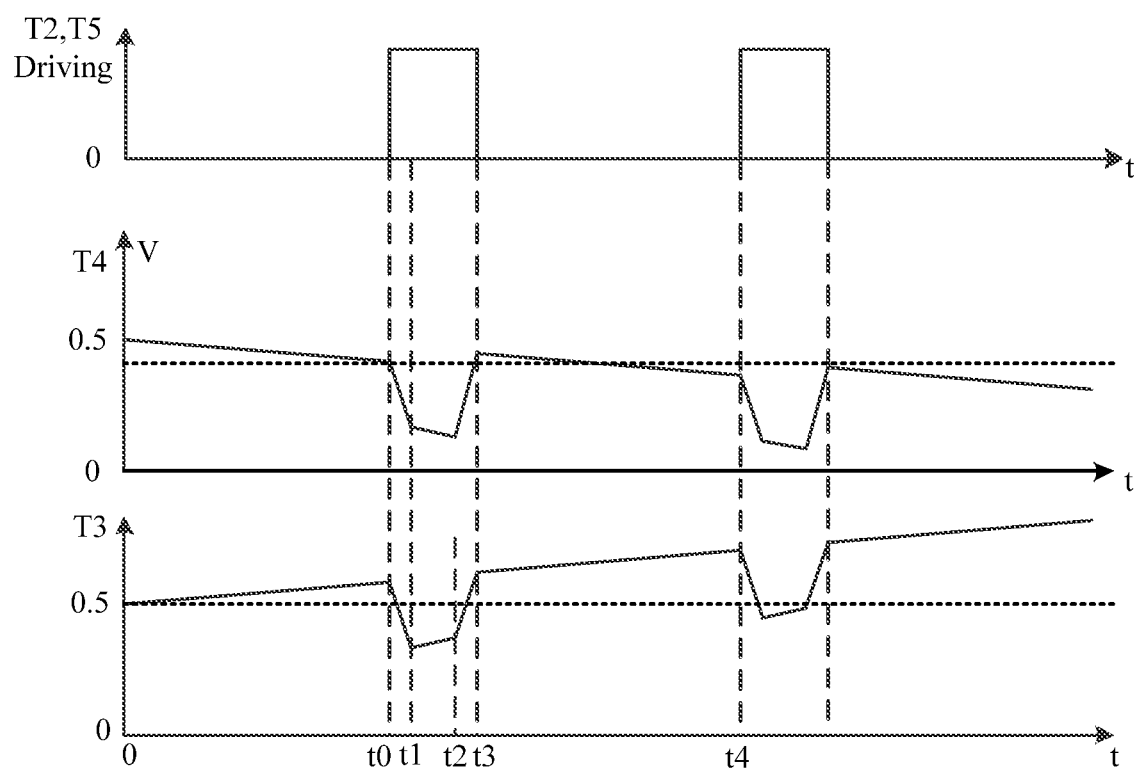
FIG. 12 is a schematic diagram shows timings and waveforms of voltage stresses in the circuit shown in FIG. 11a to FIG. 11d.

A single current clamping switch combination based on the state code 5 is taken as an example to explain that a voltage across an inner switch tube can be effectively clamped in only one direction and cannot be clamped in the other direction based on this state code, which causes a failure of the inner switch tube. Based on this state code, if a control is to be performed based on the flow chart shown in FIG. 3a or FIG. 3b, the control will be performed based on a combination of switch tubes corresponding to an appropriate state code, where the state code is selected based on the direction of a current flowing through the circuit. If the state code is selected incorrectly, the voltage across the inner switch tube may be not effectively clamped. As shown in FIGS. 9a to 9d, in a case that currents flow outward, a control is performed based on the state code 5, voltage stress withstood by the inner switch tube T2 is ensured to be within a set range. Waveforms of voltage stresses in the circuit shown in FIG. 9a to FIG. 9d is shown in FIG. 10. In each cycle, FIG. 9a is a schematic diagram showing the directions of the currents in a time period from 0 to t0 and a time period from t3 to t4, FIG. 9b is a schematic diagram showing the directions of the currents in a time period from t0 to t1, FIG. 9c is a schematic diagram showing the directions of the currents in a time period from t1 to t2, and FIG. 9d is a schematic diagram showing the directions of the currents in a time period from time t2 to t3. As shown in FIGS. 11a to 11d, in a case that currents flow inward, voltage stress withstood by the inner switch tube T3 will gradually rise, and then the inner switch tube T3 will be damaged due to overvoltage. Waveforms of voltage stresses in the circuit shown in FIG. 11a to FIG. 11d is shown in FIG. 12. In each cycle, FIG. 11a is a schematic diagram showing the directions of the currents in a time period from 0 to t0 and a time period from t3 to t4, FIG. 11b is a schematic diagram showing the directions of the currents in a time period from t0 to t1, FIG. 11c is a schematic diagram showing the directions of the currents in a time period from t1 to t2, and FIG. 11d is a schematic diagram showing the directions of the currents in a time period from time t2 to t3. Therefore, with the single current clamping switch combination, if a control is to be performed based on the flow chart shown in FIG. 3a or FIG. 3b, the control will be performed after identifying a current state of the circuit and selecting an appropriate state code.

The above embodiments are provided based on ANPC topology, and operations can be performed based on various topologies such as I-NPC and multilevel according to the flow chart shown in FIG. 3a or FIG. 3b after the shutdown command is issued, to ensure that the voltage stress withstood by each switch tube is within the controlled range and will not exceed the range.

Figure 13:
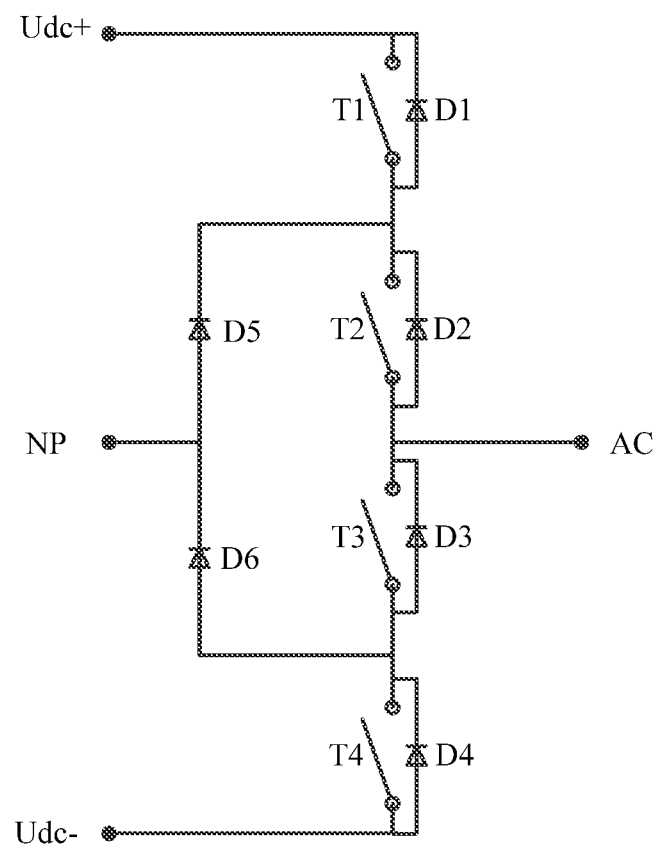
FIG. 13 is a circuit diagram of a structure of a bridge arm of a multilevel inverter circuit having an I-NPC topology according to an embodiment of the present disclosure.

For the circuit having an I-NPC topology shown in FIG. 13, each bridge arm includes two inner switch tubes T2 and T3, two outer switch tubes T1 and T4, and two clamping diodes D5 and D6. Each of the above switch tubes is provided with an anti-parallel diode or a body diode (D1 to D4 as shown in FIG. 13). Positive pole of direct current side of the bridge arm is connected to a voltage Udc+, negative pole of the direct current side of the bridge arm is connected to a voltage Udc−, midpoint of the direct current side is NP, and alternating current side is AC.

Referring to the above analysis, various states are listed as state codes shown in Table 2, where state code of the free state is 0, and in the specific combinations of switch tubes, only a combination of switch tubes corresponding to the state code 3 in this topology is a bidirectional current clamping switch combination, and combinations of switch tubes respectively corresponding to the state code 1 and the state code 2 are single current clamping switch combinations.

TABLE 2

|  | zero switch tubes are turned on Free state | One switch tube is turned on Single current clamping switch combination | Two switch tubes are turned on Bidirectional current clamping switch combination |
|---|---|---|---|
| T2 | 0 | 1 | 0 | 1 |
| T3 | 0 | 0 | 1 | 1 |
| state code | 0 | 1 | 2 | 3 |

In summary, based on the above embodiments, in an embodiment, the specific combination of switch tubes is a single current clamping switch combination, where the single current clamping switch combination includes at most two selected switch tubes in each bridge arm. The voltage stress withstood by the switch tube, on which clamping protection is not performed, in the multilevel inverter circuit is zero in a case corresponding to a state of the multilevel inverter circuit before the multilevel inverter circuit is shut down, by turning on the at most two selected switch tubes in each bridge arm.

Figure 14:
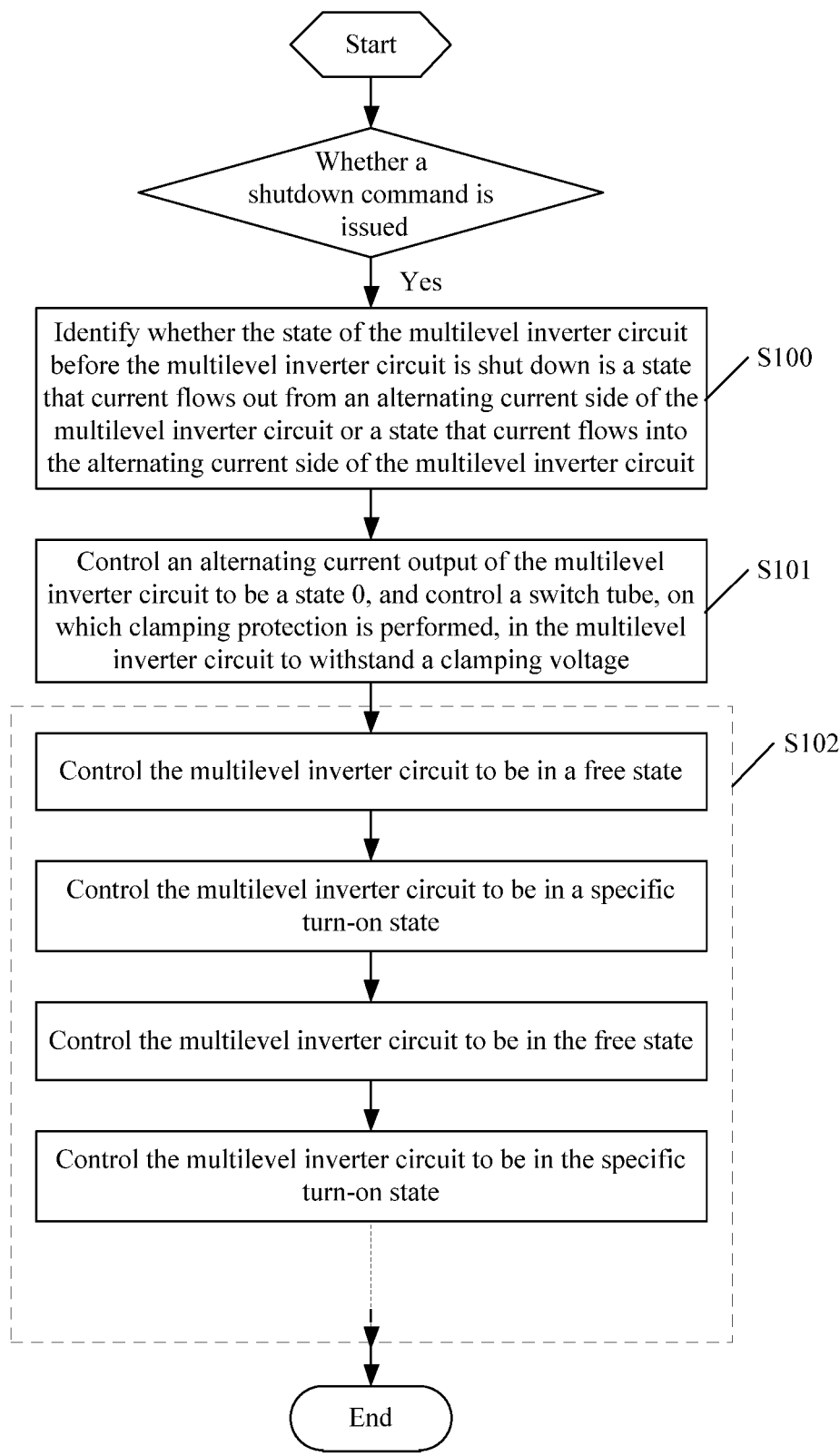
FIG. 14 is a flow chart of a method for controlling shutdown wave blocking of a multilevel inverter circuit according to an embodiment of the present disclosure.

Moreover, the method for controlling shutdown wave blocking of a multilevel inverter circuit, on the basis shown in FIG. 3a and FIG. 3b, as shown in FIG. 14 (shown on the basis of FIG. 3a), after the shutdown command is issued, the method further includes a step S100 to be performed firstly. In step S100, it is identified whether the state of the multilevel inverter circuit before the multilevel inverter circuit is shut down is a state that current flows out from an alternating current side of the multilevel inverter circuit or a state that current flows into the alternating current side of the multilevel inverter circuit. Therefore, when performing step S102, a single current clamping switch combination that should be selected can be selected, to ensure that voltage stress withstood by a switch tube, on which clamping protection is not performed, in the multilevel inverter circuit is zero.

In practice, in order to avoid performing step S100, the specific combination of switch tubes may be preferably configured as a bidirectional current clamping switch combination. In this case, the bidirectional current clamping switch combination includes at least two selected switch tubes in each bridge arm. The voltage stress withstood by the switch tube, on which clamping protection is not performed, in the multilevel inverter circuit is zero in a case that a state of the multilevel inverter circuit before the multilevel inverter circuit is shut down is a state that current flows out from an alternating current side of the multilevel inverter circuit or a state that current flows into the alternating current side of the multilevel inverter circuit, by turning on the at least two selected switch tubes in each bridge arm.

Based on the several implementations of the specific combination of switch tubes, a preferred bidirectional current clamping switch combination is provided according to the embodiment. With the bidirectional current clamping switch combination, it is avoided to perform a logic switching after determining a state of the system before the system is shut down, and the corresponding switching operation can be directly performed according to a set logic after a shutdown command is issued by the control system, thereby leading to a higher universality and a simple and reliable implementation.

The remaining principles are the same as those in the previous embodiments, and are not described again.

According to another embodiment of the present disclosure, an application apparatus for applying a method for controlling shutdown wave blocking of a multilevel inverter circuit is provided, which includes a multilevel inverter circuit and a controller. The controller is configured to perform the above method for controlling shutdown wave blocking of a multilevel inverter circuit.

In practice, the application apparatus may be any one of a photovoltaic grid-connected inverter, a shunt active power filter, and a Static Var Generator (SVG).

The multilevel inverter circuit may have an active neutral-point-clamped (ANPC) topology shown in FIG. 1a or a diode neutral-point-clamped (I-NPC) topology shown in FIG. 13. Switch tubes, on which clamping protection is performed, in the multilevel inverter circuit are two outer switch tubes in a bridge arm, and switch tubes, on which clamping protection is not performed, in the multilevel inverter circuit are two inner switch tubes in the bridge arm. Apparently, in practice, the multilevel inverter circuit may also have other inverter topologies including a clamping function, which is not specifically limited here, and depends on the specific application environment, which are all within the protection scope of this application.

The remaining principles are the same as those in the previous embodiments, and are not described again.

With the method for controlling shutdown wave blocking of a multilevel inverter circuit according to the present disclosure, it is unnecessary to add additional hardware circuits, thereby avoiding losses and increasing costs.

Embodiments of the present disclosure are described in a progressive manner, each of the embodiments emphasizes differences from other embodiments, and the same or similar parts among the embodiments can be referred to each other. For the device disclosed in the embodiments, since the device corresponds to the method disclosed in the embodiments, the description of the device is relatively simple, and the related parts can be referred to the description of the method.

The foregoing embodiments are only preferred embodiments of the present disclosure and are not meant to limit the present disclosure. The preferred embodiments according to the present disclosure are disclosed above, and are not intended to limit the present disclosure. Those skilled in the art may make, based on the disclosed method and technical content, some variations and improvements on the technical solutions of the present disclosure, or make some equivalent variations on the embodiments without departing from the scope of the technical solutions. All simple modifications, equivalent variations and improvements made based on the technical essence, without departing from the content of the technical solutions of the present disclosure, fall in the scope of the technical solutions of the present disclosure.

The invention claimed is:

1. A method for blocking a voltage wave of each switch in a multilevel inverter circuit with a plurality bridge arms when the multilevel inverter circuit is shut down, comprising:

after a shutdown command is issued, controlling the multilevel inverter circuit to switch back-and-forth between a free state and a specific turn-on state a plurality of times, wherein a duration of each free state is less than a first preset time period, wherein:

the shutdown command is not triggered by a switch fault, the free state is a state in which all switches in the multilevel inverter circuit are turned off; the specific turn-on state is a state in which voltage stress withstood by a switch, on which clamping protection is not performed, in the multilevel inverter circuit is zero by controlling a specific combination of switches in the multilevel inverter circuit to be turned on; and the first preset time period is a time period in which the voltage stress withstood by the switch, on which clamping protection is not performed, in the multilevel inverter circuit in a voltage dividing process under the free state reaches a withstand limit, wherein the clamping protection means that protection is performed by clamping;

after the shutdown command is issued and before controlling the multilevel inverter circuit to switch between the free state and the specific turn-on state, the method further comprises controlling an alternating current output of the multilevel inverter circuit to be a state 0, to cause a switch, on which clamping protection is performed, in the multilevel inverter circuit to withstand a clamping voltage; and a duration of each specific turn-on state is less than a second preset time period, to ensure that a current flowing through a bridge arm of the multilevel inverter circuit in the specific turn-on state is lower than an overcurrent limit.

2. The method according to claim 1, wherein the controlling the multilevel inverter circuit to switch between the free state and the specific turn-on state comprises:

controlling the multilevel inverter circuit to start from the free state and switch between the free state and the specific turn-on state.

3. The method according to claim 1, wherein
the specific combinations of switches corresponding to the specific turn-on state at different times are the same.

4. The method according to claim 3, wherein any one of the specific combinations of switches is a bidirectional current clamping switch combination, wherein the bidirectional current clamping switch combination comprises at least two switches in each bridge arm, wherein the voltage stress withstood by the switch, on which clamping protection is not performed, in the multilevel inverter circuit is zero in a case that a state of the multilevel inverter circuit before the multilevel inverter circuit is shut down is a state that current flows out from an alternating current side of the multilevel inverter circuit or a state that current flows into the alternating current side of the multilevel inverter circuit, by turning on the at least two switches in each bridge arm.

5. The method according to claim 3, wherein any one of the specific combinations of switches is a single current clamping switch combination, wherein the single current clamping switch combination comprises at most two switches in each bridge arm, wherein the voltage stress withstood by the switch, on which clamping protection is not performed, in the multilevel inverter circuit is zero in a case corresponding to a state of the multilevel inverter circuit before the multilevel inverter circuit is shut down, by turning on the at most two switches in each bridge arm, wherein after the shutdown command is issued and before controlling the multilevel inverter circuit to switch between the free state and the specific turn-on state with a duration of each free state being less than the first preset time period, the method further comprises:

identifying whether the state of the multilevel inverter circuit before the multilevel inverter circuit is shut down is a state that current flows out from an alternating current side of the multilevel inverter circuit or a state that current flows into the alternating current side of the multilevel inverter circuit.

6. The method according to claim 1, after the shutdown command is issued, further comprising:

after a preset time delay, controlling a disconnecting apparatus arranged between an alternating current side of the multilevel inverter circuit and a voltage source to perform a disconnection operation based on the shutdown command, wherein the preset time delay is greater than or equal to 0 seconds, and is less than a time period during which a total bus voltage of the multilevel inverter circuit is charged to a dangerous value due to the plurality of times of switching between the specific turn-on state and the free state.

7. The method according to claim 1, wherein the specific combinations of switches corresponding to the specific turn-on state at different times are different.

8. An application apparatus for applying a method for blocking a voltage wave of each switch in a multilevel inverter circuit when the multilevel inverter circuit is shut down, comprising:

the multilevel inverter circuit, and a controller configured to perform the method for blocking the voltage wave of each switch in the multilevel inverter circuit when the multilevel inverter circuit is shut down, the method comprising:

after a shutdown command is issued, controlling the multilevel inverter circuit to switch back-and-forth between a free state and a specific turn-on state a plurality of times, wherein a duration of each free state is less than a first preset time period, wherein the shutdown command is not triggered by a switch fault, the free state is a state in which all switches in the multilevel inverter circuit are turned off; the specific turn-on state is a state in which voltage stress withstood by a switch, on which clamping protection is not performed, in the multilevel inverter circuit is zero by controlling a specific combination of switches in the multilevel inverter circuit to be turned on; and the first preset time period is a time period in which the voltage stress withstood by the switch, on which clamping protection is not performed, in the multilevel inverter circuit in a voltage dividing process under the free state reaches a withstand limit, wherein the clamping protection means that protection is performed by clamping, wherein:

after the shutdown command is issued and before controlling the multilevel inverter circuit to switch between the free state and the specific turn-on state, the method further comprises controlling an alternating current output of the multilevel inverter circuit to be a state 0, to cause a switch, on which clamping protection is performed, in the multilevel inverter circuit to withstand a clamping voltage; and a duration of each specific turn-on state is less than a second preset time period, to ensure that a current flowing through a bridge arm of the multilevel inverter circuit in the specific turn-on state is lower than an overcurrent limit.

9. The application apparatus according to claim 8, wherein the application apparatus is any one of a photovoltaic grid-connected inverter, a shunt active power filter, and a Static Var Generator.

10. The application apparatus according to claim 8, wherein
the multilevel inverter circuit has an active neutral-point-clamped (ANPC) topology or a diode neutral-point-clamped (I-NPC) topology, and
switches, on which clamping protection is performed, in the multilevel inverter circuit are two outer switches in a bridge arm, and switches, on which clamping protection is not performed, in the multilevel inverter circuit are two inner switches in the bridge arm, wherein the two outer switches refers to switches having one power port connected with a direct current bus, and the two inner switches refers to switches having two power ports which are not connected with the direct current bus.

\* \* \* \* \*